(12) United States Patent
Negishi

(10) Patent No.: US 10,298,697 B2
(45) Date of Patent: May 21, 2019

(54) DEVICE MANAGEMENT SYSTEM AND INFORMATION PROCESSING APPARATUS, CONFIGURED TO OBTAIN DATA FROM STATIC SERVER WHEN DATA CANNOT BE OBTAINED FROM DYNAMIC SERVER

(71) Applicant: Yuuichiroh Negishi, Kanagawa (JP)

(72) Inventor: Yuuichiroh Negishi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 412 days.

(21) Appl. No.: 14/645,574

(22) Filed: Mar. 12, 2015

(65) Prior Publication Data

US 2015/0263907 A1    Sep. 17, 2015

(30) Foreign Application Priority Data

Mar. 17, 2014  (JP) ................................ 2014-054219

(51) Int. Cl.
*H04L 12/24* (2006.01)
*H04L 29/08* (2006.01)
*H04L 29/14* (2006.01)

(52) U.S. Cl.
CPC .......... *H04L 67/16* (2013.01); *H04L 67/1025* (2013.01); *H04L 67/34* (2013.01); *H04L 69/40* (2013.01)

(58) Field of Classification Search
CPC ..... H04L 67/16; H04L 69/40; H04L 67/1025; H04L 67/34
See application file for complete search history.

(56) References Cited

U.S. PATENT DOCUMENTS

| 6,963,914 B1* | 11/2005 | Breitbart ............. H04L 67/1095 709/225 |
| 2004/0148379 A1 | 7/2004 | Ogura |
| 2008/0215718 A1* | 9/2008 | Stolorz ............... H04L 61/1511 709/223 |
| 2011/0173599 A1* | 7/2011 | Ohama ..................... G06F 8/65 717/168 |
| 2013/0007841 A1* | 1/2013 | Knox ........................ G06F 9/54 726/3 |

FOREIGN PATENT DOCUMENTS

JP    4408033    11/2009

* cited by examiner

*Primary Examiner* — Abdulkader M Alriyashi
(74) *Attorney, Agent, or Firm* — Cooper & Dunham LLP

(57) ABSTRACT

A device management system includes: a performance request transmitting unit that transmits a performance request to perform data processing, including identification information identifying a static destination server with a fixed destination and identification information identifying a dynamic destination server with a dynamically changing destination; a dynamic destination data obtaining unit that transmits an obtaining request requesting to obtain data for performing the data processing, to the dynamic destination server using identification information of the dynamic destination server included in the performance request; a static destination data obtaining unit that determines that the data cannot be obtained, when there is no response to the obtaining request from the dynamic destination server, and then, transmits an obtaining request requesting to obtain data for performing the data processing, to the static destination server using identification information of the static destination server included in the performance request.

13 Claims, 12 Drawing Sheets

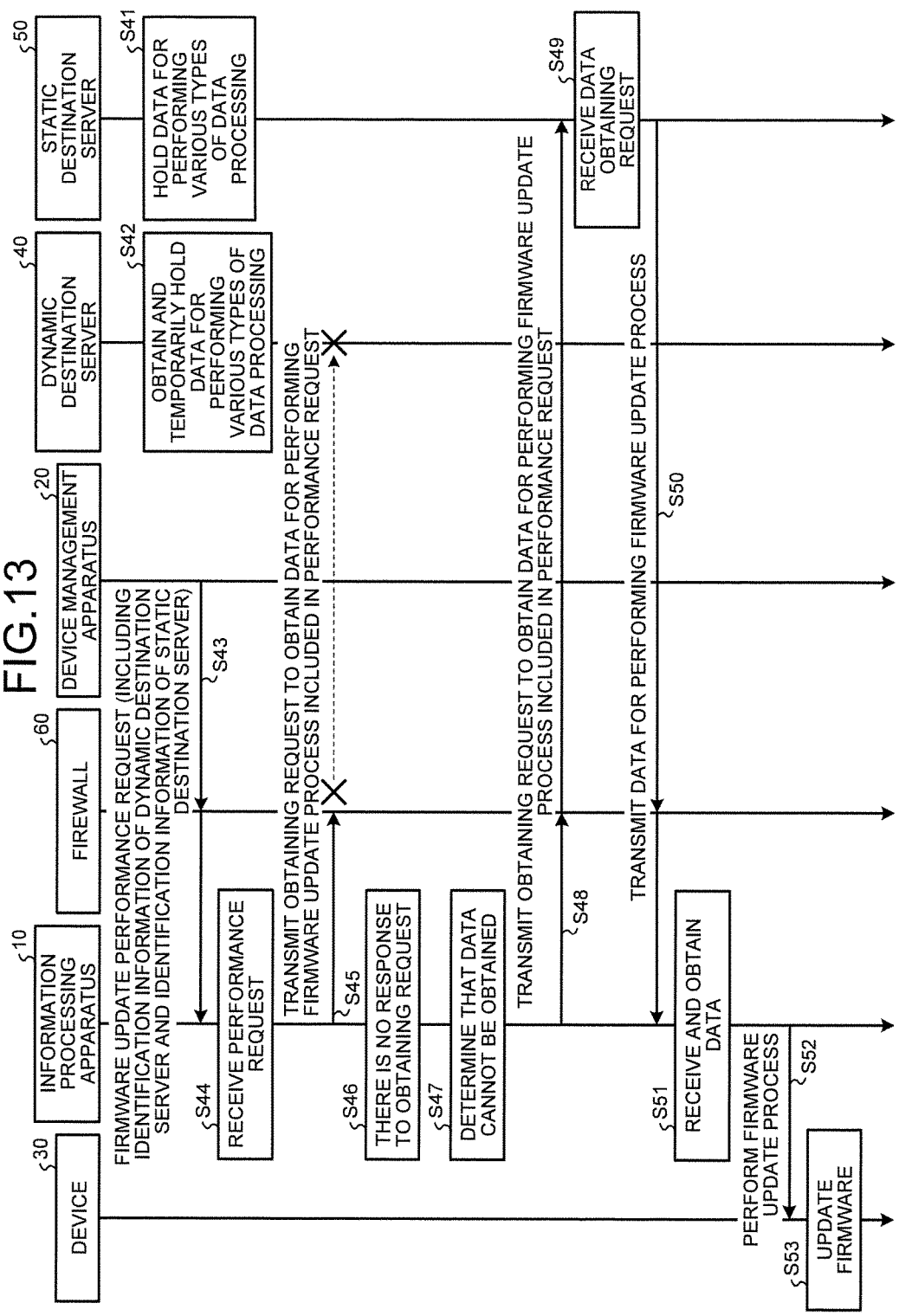

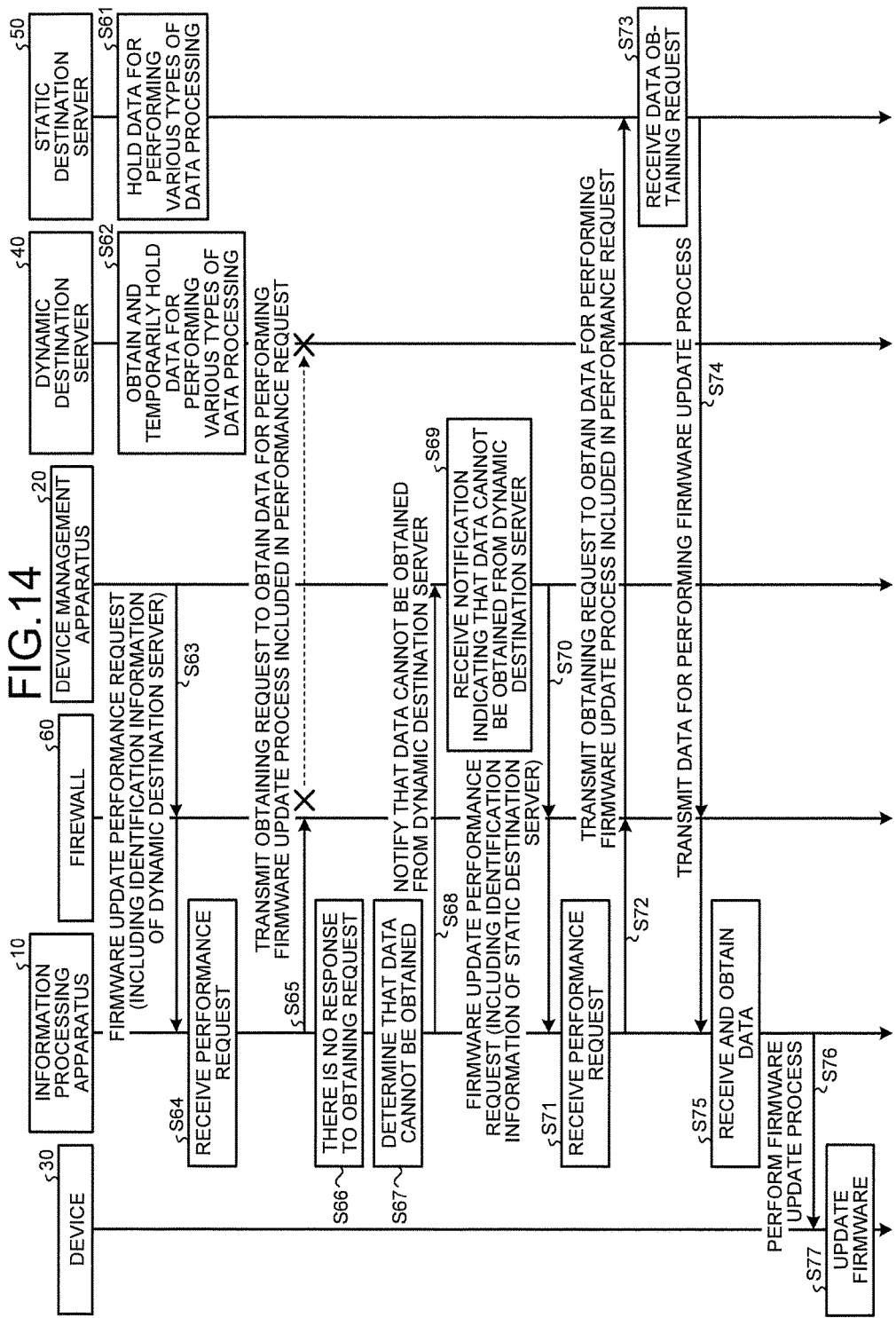

DEVICE MANAGEMENT SYSTEM AND INFORMATION PROCESSING APPARATUS, CONFIGURED TO OBTAIN DATA FROM STATIC SERVER WHEN DATA CANNOT BE OBTAINED FROM DYNAMIC SERVER

CROSS-REFERENCE TO RELATED APPLICATIONS

The present application claims priority to and incorporates by reference the entire contents of Japanese Patent Application No. 2014-054219 filed in Japan on Mar. 17, 2014.

BACKGROUND OF THE INVENTION

1. Field of the Invention

The present invention relates to a device management system and an information processing apparatus.

2. Description of the Related Art

Conventionally, there is a remote device management system that performs a remote management service by connecting an apparatus to be managed, such as an image processing apparatus, a multifunction peripheral, a printer apparatus, or a projector apparatus, to a management apparatus provided in, for example, a service center of a manufacturer of the apparatus to be managed, via a communication network such as a network or a phone line. In the remote device management system, for example, a remote device management apparatus transmits a processing request, and a device management apparatus downloads data, e.g., large-scale setting information or firmware, from the remote device management apparatus or a server specified by the remote device management apparatus, and the device management apparatus performs a process using the downloaded data, by which a remote management service is provided to the apparatus to be managed.

When the data to be downloaded is, for example, firmware of the apparatus to be managed, the remote device management apparatus transmits a firmware update request to the device management apparatus, and the device management apparatus downloads the firmware from the remote device management apparatus or a server specified by the remote device management apparatus, and transmits the downloaded firmware to the apparatus to be managed, to allow the apparatus to be managed to perform a firmware update process.

For example, JP 4408033 B1 discloses a method of updating firmware of an apparatus to be managed in a remote management system including a management apparatus and the apparatus to be managed or an intermediary apparatus that intermediates between the management apparatus and the apparatus to be managed, the method being able to reduce the processing load and communication cost incurred by the transmission of firmware by the management apparatus. In the method of updating firmware described in JP 4408033 B1, the management apparatus sets required items (conditions required for a firmware update) including the model/model number, transmission date and time, and update date and time of an image forming apparatus which is a firmware update target. When the transmission date and time specified in a target device list file have come based on the required items, the management apparatus allows the intermediary apparatus to perform a firmware update, by which the firmware of the apparatus to be managed which is installed in, for example, an office of each customer can be automatically updated.

Meanwhile, when a server that holds data such as moving image files, large-scale setting information, image files, firmware, mapping information, and navigation information is simultaneously accessed by multiple devices, the load on the server increases. Hence, to distribute the load on the server, original data on content held by a static destination server with a uniquely fixed destination (hereinafter, also called a static destination download server with a uniquely fixed destination) is temporarily saved in dynamic destination servers with dynamically changing destinations (hereinafter, also called dynamic destination download servers with dynamically changing destinations) which are disposed in a distributed manner. A load distribution system is known in which a destination of a dynamic destination server to which the fastest access can be made is dynamically determined, and dynamically determined dynamic destination servers are assigned to users, by which an increase in data download speed and server load distribution are achieved.

However, in the conventional remote device management system, the communication destinations of the device management apparatus are only the remote device management apparatus and the static destination server which have static destinations. Hence, when dynamic destination servers are introduced in the remote management system to distribute the load on the remote device management apparatus or the static destination server, there is a problem that a remote device management service cannot be provided to customers with communication restrictions with a firewall.

In addition, in the method of updating firmware of an apparatus to be managed which is described in JP 4408033 B1, in the case of customers with communication restrictions with a firewall, since communication with dynamic destination servers is restricted, there is a problem that, for example, data such as firmware cannot be downloaded.

Hence, although conventionally the device management apparatus downloads data, e.g., large-scale setting information or firmware, from the remote device management apparatus or a static destination server specified by the remote device management apparatus, in order to distribute the load on the remote device management apparatus or the static destination server, there is a demand for a remote device management system using dynamic destination servers.

In view of the above, there is a need to provide a device management system and an information processing apparatus that can download data such as firmware even when customers have communication restrictions with a firewall.

SUMMARY OF THE INVENTION

It is an object of the present invention to at least partially solve the problems in the conventional technology.

A device management system includes: an information processing apparatus that communicates with a device; and a device management apparatus that communicates with the information processing apparatus through a first communication network. The device management system includes: a performance request transmitting unit that transmits a performance request to perform data processing, including identification information identifying a static destination server with a fixed destination and identification information identifying a dynamic destination server with a dynamically changing destination, the static destination server holding data for performing various types of data processing, and the dynamic destination server temporarily holding the data held by the static destination server; a performance request receiving unit that receives the performance request; a dynamic destination data obtaining unit that transmits an obtaining request requesting to obtain data for performing the data processing, to the dynamic destination server using the identification information of the dynamic destination server included in the performance request, to obtain the data; a static destination data obtaining unit that determines that the data cannot be obtained, when there is no response to the obtaining request from the dynamic destination server, and then, transmits an obtaining request requesting to obtain data for performing the data processing, to the static destination server using the identification information of the static destination server included in the performance request, to obtain the data; and a data processing performing unit that performs the data processing using the obtained data.

A device management system includes: an information processing apparatus that communicates with a device; and a device management apparatus that communicates with the information processing apparatus through a first communication network. The device management apparatus includes: a communicating unit that communicates with the information processing apparatus; and a performance request transmitting unit that transmits a performance request to perform data processing, including identification information identifying a static destination server with a fixed destination and identification information identifying a dynamic destination server with a dynamically changing destination, the static destination server holding data for performing various types of data processing, and the dynamic destination server temporarily holding the data held by the static destination server. The information processing apparatus includes: a communicating unit that communicates with the device management apparatus; a performance request receiving unit that receives the performance request; a dynamic destination data obtaining unit that transmits an obtaining request requesting to obtain data for performing the data processing, to the dynamic destination server using the identification information of the dynamic destination server included in the performance request, to obtain the data; a static destination data obtaining unit that determines that the data cannot be obtained, when there is no response to the obtaining request from the dynamic destination server, and then, transmits an obtaining request requesting to obtain data for performing the data processing, to the static destination server using the identification information of the static destination server included in the performance request, to obtain the data; and a data processing performing unit that performs the data processing using the obtained data.

An information processing apparatus is in a device management system. The information processing apparatus communicates with a device management apparatus through a first communication network. The information processing apparatus includes: a communicating unit that communicates with the device management apparatus; a performance request receiving unit that receives, from the device management apparatus, a performance request for performing data processing, including identification information identifying a static destination server with a fixed destination and identification information identifying a dynamic destination server with a dynamically changing destination, the static destination server holding data for performing various types of data processing, and the dynamic destination server temporarily holding the data held by the static destination server; a dynamic destination data obtaining unit that transmits an obtaining request requesting to obtain data for performing the data processing, to the dynamic destination server using the identification information of the dynamic destination server included in the performance request, to obtain the data; a static destination data obtaining unit that determines that the data cannot be obtained, when there is no response to the obtaining request from the dynamic destination server, and then, transmits an obtaining request requesting to obtain data for performing the data processing, to the static destination server using the identification information of the static destination server included in the performance request, to obtain the data; and a data processing performing unit that performs the data processing using the obtained data.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 13 is a sequence diagram of a process performed when a firmware update request is issued from the device management apparatus to the information processing apparatus with a customer's installation environment having communication restrictions with a firewall; and FIG. 14 is a sequence diagram of another process performed when a firmware update request is issued from the device management apparatus to the information processing apparatus with a customer's installation environment having communication restrictions with a firewall.

DETAILED DESCRIPTION OF THE PREFERRED EMBODIMENTS

Figure 1:
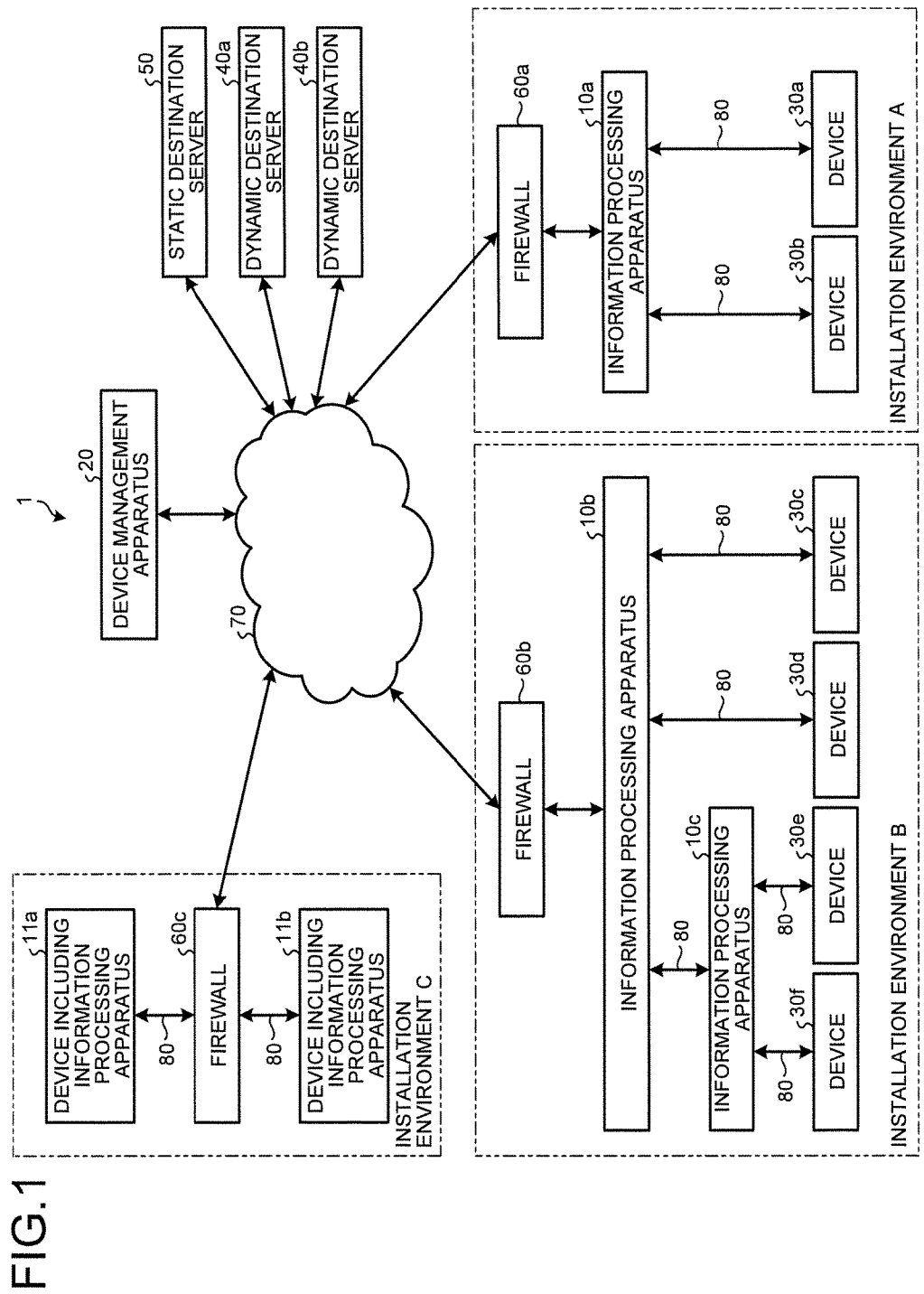
FIG. 1 is a diagram illustrating an example of the overall system configuration of a device management system according to the present embodiment.

With reference to the accompanying drawings, an embodiment of a device management system and an information processing apparatus according to the present invention will be described in detail below. Note that the present invention is not limited to the following embodiment. Note also that embodiments may be appropriately combined together provided that there is no contradiction in content.

A device management system of the present embodiment is a device management system including an information processing apparatus that communicates with a device; and a management apparatus that communicates with the information processing apparatus through a first communication network. When the device management apparatus causes the information processing apparatus to perform data processing such as a firmware update process, the device management apparatus transmits a performance request including both of identification information of a dynamic destination server with a dynamically changing destination and identification information of a static destination server with a fixed destination. The information processing apparatus establishes a connection with the dynamic destination server first on a priority basis. When the information processing apparatus cannot download data, the information processing apparatus can download data by connecting to the static destination server with a fixed destination that is free from communication restrictions with any firewall. The information processing apparatus performs data processing on the device using the obtained data for performing data processing. By this, a remote device management service can be provided as with conventional cases even to customers that currently have communication restrictions with a firewall and even when a dynamic destination server is newly installed in a remote management system.

In the following, an example will be described in which an information processing apparatus of the present embodiment is implemented as one of the apparatuses included in a device management system that performs remote management by communicating with a device (image processing apparatus) and a device management apparatus. A system to which the information processing apparatus of the present embodiment can be applied is not limited to such a device management system. In addition, although in the following an example case is described in which a device according to the present invention is applied to a Multifunction Peripheral (MFP), the device is not limited thereto. Note that the multifunction peripheral is an apparatus having at least two of a print function, a copy function, a scanner function, and a facsimile function. Note also that the device is not limited to an MFP and may be, for example, an electronic apparatus (communication apparatus) which is a printer, an LP (Laser Pinter), an inkjet printer, a FAX apparatus, a digital copier, a scanner apparatus, a projector, a camera, a car navigation system, a network-connected home appliance, a vending machine, a medical device, a power supply apparatus, an air conditioning system, or a metering system for gas, water, electricity, etc., provided with a communication function.

First, an exemplary overall system configuration of a device management system 1 and a summary of the device management system 1 will be described using FIG. 1. FIG. 1 is a diagram illustrating an example of the overall system configuration of the device management system of the present embodiment.

As illustrated in FIG. 1, the device management system 1 includes a plurality of information processing apparatuses 10a, 10b, and 10c and a plurality of devices 11a and 11b including an information processing apparatus that communicate with a device management apparatus 20 through a first communication network 70; the device management apparatus 20 that remotely manages the plurality of information processing apparatuses 10a to 10c, a plurality of devices 30a to 30f, and the plurality of devices 11a and 11b including an information processing apparatus; the devices 30a to 30f that communicate with the information processing apparatuses 10a to 10c through second communication networks 80 and that are managed by the device management apparatus 20; and a plurality of dynamic destination servers 40a and 40b and a static destination server 50 that communicate with the information processing apparatuses 10a to 10c through the first communication network 70.

When there is no need to distinguish the plurality of information processing apparatuses 10a to 10c from each other, they are hereinafter represented as information processing apparatuses 10. In addition, when there is no need to distinguish the plurality of devices 30a to 30f from each other, they are represented as devices 30. In addition, when there is no need to distinguish the plurality of devices 11a and 11b including an information processing apparatus from each other, they are represented as devices 11 including an information processing apparatus. In addition, when there is no need to distinguish the plurality of dynamic destination servers 40a and 40b from each other, they are represented as dynamic destination servers 40.

The information processing apparatuses 10 are installed in, for example, offices on the device user side and have, for example, the function of an intermediary apparatus having management software implemented thereon which is used when the device management apparatus 20 remotely manages the devices 30. Namely, the information processing apparatuses 10 have an application program implemented thereon that controls and manages the devices 30 connected thereto by the communication networks 80.

The device management apparatus 20, for example, intensively and remotely manages each device 30 through a corresponding information processing apparatus 10 having the function of an intermediary apparatus. Note that in the case of the devices 11 including an information processing apparatus, since devices 30 have the function of the information processing apparatus 10, the device management apparatus 20 directly and remotely manages the devices 11 including an information processing apparatus. The device management apparatus 20 has an application program implemented thereon that controls and manages the information processing apparatuses 10 and controls and manages the devices 30 through the corresponding information processing apparatuses 10. The device management apparatus 20 is an apparatus that remotely performs, for example, a firmware update, counter counting (charging process), a consumable order, or dispatch of a CE (dispatch of a customer engineer) from data notified from the devices 30 via the information processing apparatuses 10. In addition, the device management apparatus 20 requests an information processing apparatus 10 or a device 11 including an information processing apparatus to obtain information held by the static destination server 50 or a dynamic destination server 40 which will be described later, and the information processing apparatus 10 or the device 11 including an information processing apparatus accesses the dynamic destination server 40 or the static destination server 50 to obtain data for performing data processing, and performs a process in accordance with the obtained data. Note that the device management apparatus 20 is installed in, for example, a service center (management center) to perform a remote management service.

The devices 30 are network devices, e.g., MFPs. In the present embodiment, an example in which the devices 30 are MFPs is described. The plurality of devices 30 are connected to the corresponding information processing apparatuses 10 through the communication networks 80 on a per device 30 basis and are connected, via firewalls 60*a* and 60*b*, to the device management apparatus 20 connected to the communication network 70. In addition, the plurality of devices 11*a* and 11*b* including an information processing apparatus are connected, via a firewall 60*c*, to the device management apparatus 20 connected to the communication network 70. When there is no need to distinguish the firewalls 60*a*, 60*b*, and 60*c* from each other, they are hereinafter represented as firewalls 60. Note that it is also possible to connect terminal apparatuses such as personal computers or other electronic apparatuses (external apparatuses) to the devices 30 and the devices 11 including an information processing apparatus, via networks such as LANs (Local Area Networks).

The dynamic destination servers 40 are connected to the information processing apparatuses 10 and the device management apparatus 20 through the communication network 70. The dynamic destination servers 40 are dynamic destination servers with dynamically changing destinations that temporarily hold data for performing various types of data processing. The dynamic destination servers 40 temporarily hold data held by the static destination server 50 which will be described later, and are, for example, disposed in a distributed manner all over the world. Identification information for accessing the dynamic destination servers 40, e.g., IP addresses, is determined by, for example, the name resolution (a mechanism for achieving mutual resolutions by mapping IP addresses to host names is called "name resolution") of the DNS (Domain Name System) which is a publicly known technology. For example, a destination address (e.g., an IP address) closest to a client accessing a dynamic destination server 40 is dynamically assigned, and communication is performed with respect to the address. In the present embodiment, when a request to access a dynamic destination server 40 is made to an information processing apparatus 10 or a device 11 including an information processing apparatus, for example, an IP address is notified as identification information that identifies the dynamic destination server 40. Alternatively, for example, a destination of the host name or domain name of the dynamic destination server 40 is specified and notified. The information processing apparatuses 10 or the devices 11 including an information processing apparatus can access the dynamic destination servers 40 by performing name resolution of a host name by the DNS. Note that a detailed description of the function of dynamically assigning IP addresses by the DNS is omitted.

The static destination server 50 is connected to the information processing apparatuses 10 and the device management apparatus 20 through the communication network 70. The static destination server 50 is a static destination server with a uniquely fixed destination that holds original data for performing various types of data processing. The static destination server 50 is, for example, an original server that holds data for performing data processing which is transmitted to the information processing apparatuses 10, the devices 30, and the devices 11 including an information processing apparatus. When a request to access the static destination server 50 is made, for example, an IP address is notified as identification information that identifies the static destination server 50. Note that for the data held by the static destination server 50, for example, information such as firmware of the devices 30, update firmware, device setting information, large-scale setting information, mapping information, navigation information, image files, and moving image files is held. Namely, data for performing data processing is held.

The communication network 70 is, for example, a high-security dedicated line or VPN (Virtual Private Network) or a public network such as the Internet. Examples of the communication network 70 include a fixed phone line such as an analog line, an ADSL line, a digital line (ISDN line), or a line using an optical fiber, or a mobile phone line such as a cellular phone line or a PHS line. The communication networks 80 are, for example, computer networks such as intra-company LANs used in company offices, etc. Note that the communication network 70 corresponds to a "first communication network" in the claims and the communication network 80 corresponds to a "second communication network" in the claims.

Although FIG. 1 exemplifies the case in which the number of the information processing apparatuses 10 connected to the device management apparatus 20 is three, the number of the information processing apparatuses 10 is not limited thereto and is any. In addition, although the case is exemplified in which the number of the devices 30 connected to each information processing apparatus 10 is two (six in total), the number of the devices 30 is not limited thereto and is any. In addition, although the case is exemplified in which the number of the devices 11 including an information processing apparatus is two, the number of the devices 11 including an information processing apparatus is not limited thereto and is any. In addition, although the case is exemplified in which the number of the dynamic destination servers 40 is two, the number of the dynamic destination servers 40 is not limited thereto and is any.

In the device management system 1, a service where the device management apparatus performs remote management via the communication network 70 is referred to as an "NRS (New Remote Service)". In the device management system 1, to implement an NRS 331, the information processing apparatuses 10 and the devices 30 that have software for the NRS 331 implemented thereon are connected to the communication networks 80 on the user side of the devices 30.

In addition, to perform remote management, the device management system 1 has the function of transmitting to each information processing apparatus 10 and each device 30 a "request" which is a request for a process for a method of a mutually implemented application, by an RPC (Remote Procedure Call) and transmitting and receiving a "response" which is the result of the requested process. Specifically, each information processing apparatus 10 or a device 30 connected to the information processing apparatus 10 can generate a request to the device management apparatus 20 and deliver the generated request to the device management apparatus 20 and obtain a "response" to the "request". On the other hand, the device management apparatus 20 can generate a request to the above-described information processing apparatus 10 side, deliver the generated request to the information processing apparatus 10 side, and obtain a "response" to the "request". The request also includes allowing the information processing apparatus 10 to transmit various types of requests to the device 30 and obtaining responses from the device 30 through the information processing apparatus 10.

In addition, to implement an RPC, known protocols (communication standards), technologies, specifications, etc., can be used, such as PPP (Point-to-Point Protocol), TCP/IP (Transmission Control Protocol/Internet Protocol), SOAP (Simple Object Access Protocol), HTTP (Hyper Text Transfer Protocol), FTP (File Transfer Protocol), COM (Component Object Model), and CORBA (Common Object Request Broker Architecture).

Next, with reference to FIG. 1, an example of customers' usage environments according to the present embodiment will be described. As illustrated in FIG. 1, in a customer's installation environment A, the information processing apparatus 10a that can, for example, establish a direct connection by HTTP with the device management apparatus 20 forms a simple hierarchical structure having the devices 30a and 30b.

In a customer's installation environment B, since four devices 30c to 30f are installed, installing only one information processing apparatus 10b increases the load on the information processing apparatus 10b. Hence, the information processing apparatus 10b that can establish a direct connection by HTTP with the device management apparatus not only has the devices 30c and 30d, but also has another information processing apparatus 10c, and the information processing apparatus 10c forms a hierarchical structure further having the devices 30e and 30f. In the case of the installation environment B, information transmitted from the device management apparatus 20 to remotely manage the devices 30e and 30f reach the devices 30e and 30f via the information processing apparatus 10b and the information processing apparatus 10c which is a lower-level node of the information processing apparatus 10b.

A customer's installation environment C has a configuration in which the devices with an information processing apparatus function in which devices 30 have the function of the information processing apparatus 10 (hereinafter, also referred to as "devices including an information processing apparatus") 11a and 11b are connected to the device management apparatus 20 through the communication network 70 without through information processing apparatuses 10. Note that, though not illustrated, it is also possible to further connect a device 30 to a lower level of each device 11 including an information processing apparatus.

Taking security aspects into account, the firewalls 60 (60a, 60b, and 60c) are installed in the above-described installation environments A, B, and C. The firewalls 60 can be configured by, for example, proxy servers. The firewalls 60 can perform, for example, setting to allow only communication for specific destinations using IP addresses or setting to prohibit communication. When a communication destination can be identified in advance, setting can be performed to enable communication with only the identified communication destination. However, when the destination changes every time communication is performed, setting to allow communication cannot be performed in advance. Due to this, if communication is restricted (setting to prohibit communication is performed) by the firewalls 60, communication with the dynamic destination servers 40 which will be described later cannot be performed. Hence, the present embodiment enables downloading of data such as firmware even when customers restrict communication using the firewalls 60. Note that, for firewall schemes, "packet filtering" where communication is controlled based on information included in an IP header, "application gateway" where operations from application are relayed, "stateful packet inspection" where filtering is performed on a per-session basis based on a table created based on information from each layer, etc., are exemplified.

Figure 2:
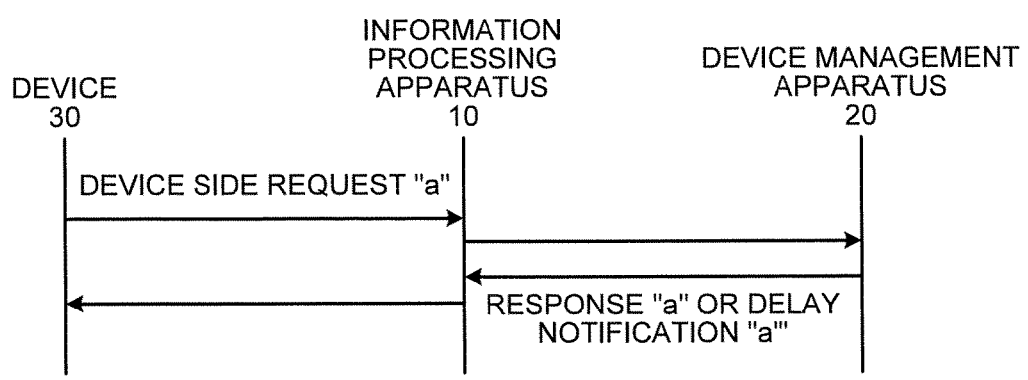
FIG. 2 is a diagram describing a data transmission and reception model of transmission and reception in the device management system according to the present embodiment.
Figure 3:
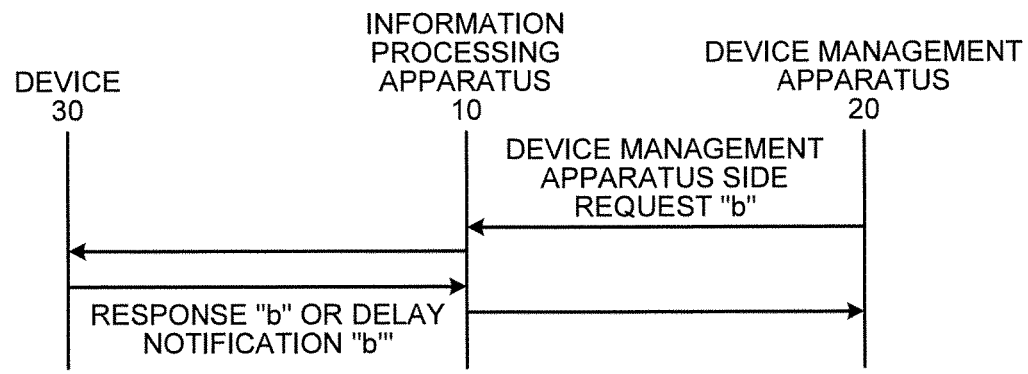
FIG. 3 is a diagram describing a data transmission and reception model of transmission and reception in the device management system according to the present embodiment.

Next, using FIGS. 2 and 3, data transmission and reception models of transmission and reception in the device management system 1 will be described. FIGS. 2 and 3 are diagrams describing data transmission and reception models of transmission and reception in the device management system. First, as illustrated in FIG. 2, it is a case in which a request to the device management apparatus 20 occurs in a device 30. The example of FIG. 2 illustrates a model in which the device 30 generates a device side request "a" and the device management apparatus 20 having received the device side request "a" via an information processing apparatus 10 sends back a response "a" to the request. Note that in the case of the above-described installation environment B illustrated in FIG. 1, the information processing apparatus 10 illustrated in FIG. 2 may be installed in plural number. Note that the example of FIG. 2 illustrates the case of sending back not only the response "a" but also a response delay notification "a'". The case of sending back the response delay notification "a'" takes place because the device management apparatus 20 is configured such that, when the device management apparatus 20 receives a device side request via the information processing apparatus 10 and determines that the device management apparatus 20 cannot immediately send back a response to the request, the device management apparatus 20 notifies of a response delay notification "a'" and temporarily disconnects a connected state and delivers a response to the request upon the next connection.

Next, as illustrated in FIG. 3, it is a case in which a request to a device 30 occurs in the device management apparatus 20. The example of FIG. 3 illustrates a model in which the device management apparatus 20 generates a device management apparatus side request "b" and the device 30 having received the device management apparatus side request "b" via an information processing apparatus 10 sends back a response "b" to the request. Note that the example of FIG. 3 illustrates the case of sending back not only the response "b" but also a response delay notification "b'". For the case of sending back the response delay notification "b'", when the device 30 determines that the device 30 cannot immediately send back a response "b", the device 30 sends back a response delay notification "b'", which is the same as the case illustrated in the example of FIG. 2. Communication performed between the device management apparatus 20, the information processing apparatus 10, and the device 30 may be, for example, secure communication which performs mutual authentication by using an encryption technology such as SSL (Secure Sockets Layer). In addition, though not illustrated, the information processing apparatus 10 can also perform the same communication with the dynamic destination servers 40 or the static destination server 50 in response to a request from the device management apparatus 20 or the device 30.

Figure 4:
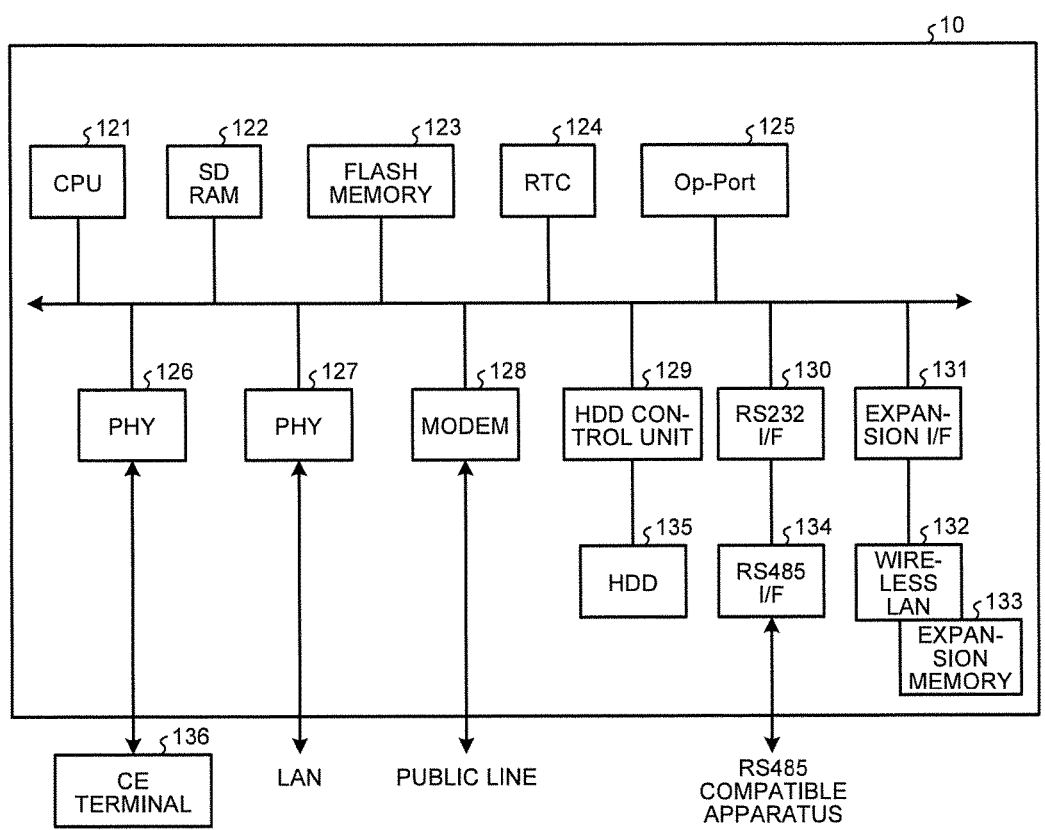
FIG. 4 is a diagram illustrating an example of a hardware configuration of an information processing apparatus according to the present embodiment.

Next, using FIG. 4, a hardware configuration of the information processing apparatus 10 will be described. FIG. 4 is a diagram illustrating an example of a hardware configuration of an information processing apparatus.

As illustrated in FIG. 4, the information processing apparatus 10 includes a CPU 121, an SDRAM 122, a flash memory 123, an RTC 124, an Op-Port 125, PHYs 126 and 127, a modem 128, an HDD control unit 129, an RS232 I/F 130, an expansion I/F 131, a wireless LAN 132, an expansion memory 133, an RS485 I/F 134, and an HDD 135.

The CPU 121 performs overall control of the operation of the information processing apparatus 10. The CPU 121 controls the overall operation of the information processing apparatus 10 by executing programs stored in the SDRAM 122, the flash memory 123, and the HDD 135. In addition, the CPU 121 implements various types of functions. In addition, the CPU 121 performs processes of the information processing apparatus 10 by controlling each unit of the information processing apparatus 10 by performing data computing based on the programs in the SDRAM 122, the flash memory 123, and the HDD 135.

The SDRAM 122 is a memory that stores various types of programs. In addition, the SDRAM 122 is a memory used when the CPU 121 performs data processing. Note that instead of the SDRAM 122, a DRAM or an SRAM may be used.

The flash memory 123 is a memory that stores various types of programs and an OS (Operating System) image. In addition, the flash memory 123 is a memory that stores data (models/model numbers, IP addresses, etc.) that requires various types of non-volatility. The flash memory 123 is also a storage memory for implementing the functions of the device management system 1. Note that instead of the flash memory 123, other non-volatile memories such as an EEPROM may be used.

The RTC (Real Time Cock) 124 is a real-time clock circuit which is an internal clock. The RTC 124 is a chip dedicated to check time which is mounted on a motherboard. For example, a scheme is adopted in which the OS obtains a date and time from the real time clock at startup and thereafter the OS side checks time on its own.

The Op-Port 125 is an operating unit's connection port.

The PHYs (PHYsical Layers) 126 and 127, for example, function to convert a logical signal to an actual electrical signal in an interface such as Ethernet (registered trademark). The PHY 126 is connected to, for example, a CE terminal 136 or a device 30 on a network. The PHY 127 is connected to, for example, a LAN.

The modem 128 digital-modulates a digital signal into an analog signal in accordance with the characteristics of a transmission line and transmits the analog signal, and demodulates an analog signal from the transmission line into a digital signal and receives the digital signal. The modem 128, for example, exchanges a communication protocol with a device 30 through a public network and establishes a connection with the device 30.

The HDD control unit 129 controls the HDD 135 connected thereto.

The RS232 (Recommended Standard 232) I/F 130 is a serial port interface. The RS232 I/F is connected to the RS485 I/F 134. Although the information processing apparatus 10 can be connected to a device 30 through the RS232 I/F 130 and the RS485 I/F 134, in the present embodiment the I/Fs are not used.

The expansion I/F 131 is an interface used when an expansion card is installed in a main body.

The wireless LAN 132 has the expansion memory 133. The wireless LAN 132 wirelessly connects to a LAN.

The RS485 I/F 134 is characterized by a two-wire, half-duplex, multipoint serial connection. The RS485 I/F 134 is connected to an RS485 compatible device.

The HDD (Hard disk drive) 135 stores various types of programs which are executed by the device management apparatus 20. In addition, the HDD 135 stores files, data, etc., required to implement various types of functions of the device management apparatus 20. In addition, the HDD 135 stores various types of management information parameters (device information) and a management program which are used to manage devices 30 which are management targets.

Note that the above-described programs for the information processing apparatus 10 may be recorded and distributed as files in an installable format or an executable format in a computer-readable recording medium such as a recording medium.

Figure 5:
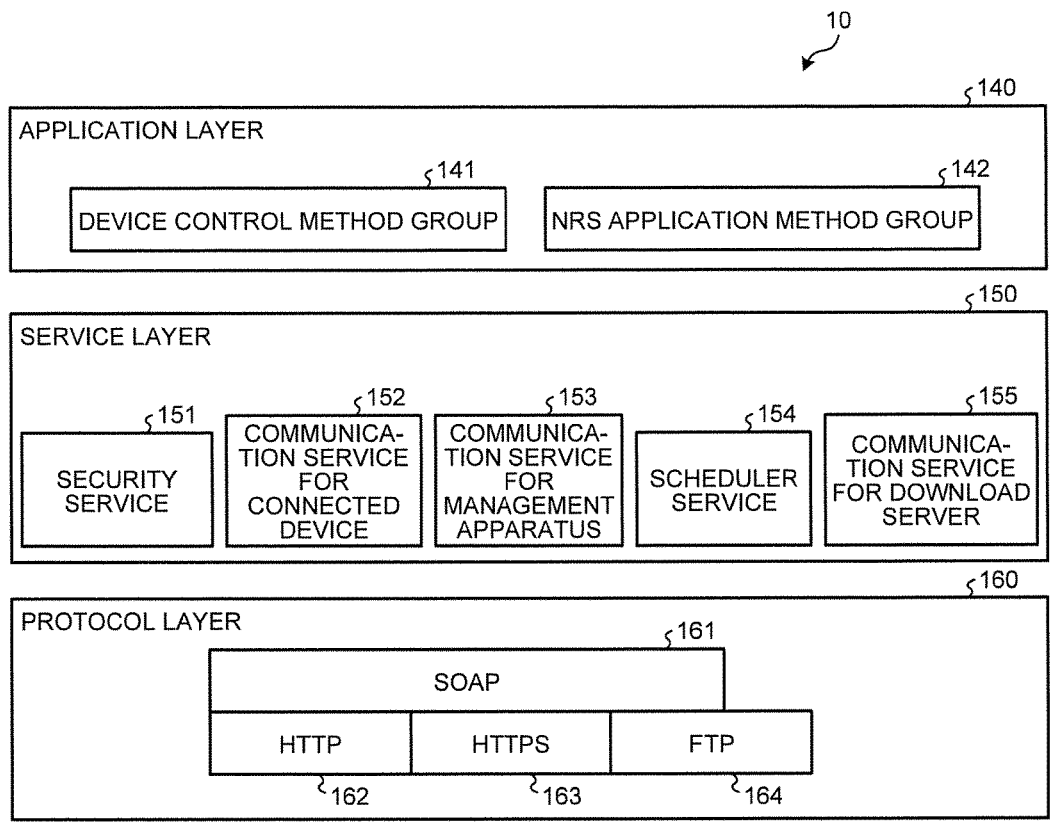
FIG. 5 is a diagram illustrating an example of a software configuration of the information processing apparatus according to the present embodiment.

Next, using FIG. 5, a software configuration of the information processing apparatus 10 will be described. FIG. 5 is a diagram illustrating an example of a software configuration of an information processing apparatus according to the present embodiment.

As illustrated in FIG. 5, the information processing apparatus 10 is composed of an application layer 140, a service layer 150, and a protocol layer 160.

The information processing apparatus 10 starts these programs by the CPU 121 starting, for example, a boot program in the flash memory 123 via an ASIC which is not illustrated. Furthermore, the CPU 121 reads an OS image and loads the OS image into the SDRAM 122 for expansion into an OS and then starts the OS. Then, the information processing apparatus 10 further reads, as necessary, programs such as an application and a service in the flash memory 123 and loads the programs into the SDRAM 122 for expansion and starts the programs and thereby implements functions. In addition, the CPU 121 executes the above-described programs as necessary to control the information processing apparatus 10, and thereby implements various types of functions. Examples of the various types of functions include the functions of a software writing unit, a software transmitting unit, a schedule writing unit, a transmission requesting unit, a communication speed measuring unit, a communication speed notifying unit, a state checking unit, and an update date/time changing unit.

In the software of the present embodiment, the application layer 140 is composed of a device control method group 141 and an NRS application method group 142.

The device control method group 141 includes methods for management target information setting, device setting, firmware update, polling setting change, log output, and startup process, and is a program for performing, for example, a firmware update process, information management of devices 30, and communication setting which are the features of the present embodiment.

The NRS application method group 142 includes methods for log collection, firmware download, device command execution, device setting change, supply notification, abnormality notification, device startup/installation, and device's dead/alive check, and is a program for handling various notifications or requests from the devices 30 and allowing the devices 30 to perform operation according to requests from the device management apparatus 20.

The service layer 150 is composed of a security service 151, a communication service for a connected device 152, a communication service for a management apparatus 153, a scheduler service 154, and a communication service for a download server 155.

The security service 151 is a module that generates and executes jobs such as preventing and hindering illegal leakage of internal information, etc., to the outside.

The communication service for a connected device 152 is a module that generates and executes jobs such as a search for a device which is an information obtaining target, a connection management with the target device, file transmission and reception, parameter management, and APL management, in order to implement the giving and receiving of information with a network connected device which is connected to the information processing apparatus 10.

A communication service for a management apparatus 153 is a module that generates and executes jobs such as command reception, file transmission and reception, information requests, and information transmission (information notification) with the device management apparatus 20.

The scheduler service 154 is a module that expands a remote control application, based on predetermined set time information.

The communication service for a download server 155 is a module that generates and executes jobs such as obtaining of data from the dynamic destination servers 40 and the static destination server 50.

The protocol layer 160 includes methods for generating and executing jobs for giving and receiving information using protocols according to information transmission and reception targets. Namely, in order that the information processing apparatus 10 can widely support the communication environments of network connected devices through networks, the protocol layer 160 has methods capable of controlling a SOAP (Simple Object Access Protocol) 161 and an HTTP 162, an HTTPS (Hypertext Transfer Protocol Security) 163, an FTP 164, etc., which are used as lower-level protocols of the SOAP 161.

Figure 6:
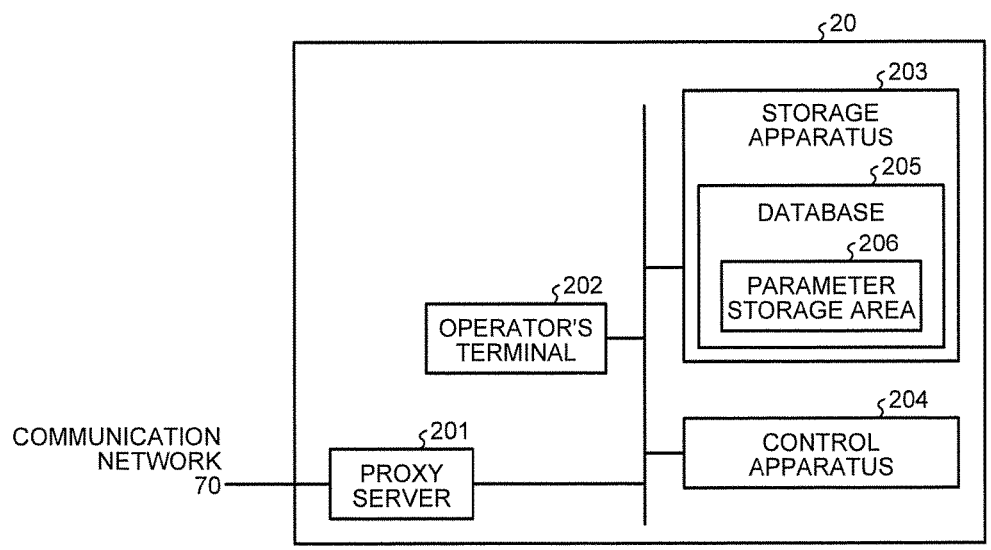
FIG. 6 is a diagram illustrating an example of a hardware configuration of a device management apparatus according to the present embodiment.

Next, using FIG. 6, a hardware configuration of the device management apparatus 20 will be described. FIG. 6 is a diagram illustrating an example of a hardware configuration of a device management apparatus.

As illustrated in FIG. 6, the device management apparatus 20 includes a proxy server 201, an operator's terminal 202, a storage apparatus 203, and a control apparatus 204.

The proxy server 201 is connected to the communication network 70 and performs, for example, security management by performing communication with the information processing apparatuses 10 and the devices 30 on the device user side through the communication network 70. In addition, the proxy server 201 functions as a communicating unit.

The operator's terminal 202 is a user interface that is composed of, for example, pointing devices such as a keyboard and a mouse and a display and accepts user's various operation instructions. In addition, the operator's terminal 202 is an input interface that inputs various types of data. For the operator's terminal 202, for example, a touch panel or an audio input apparatus may serve as the operator's terminal 202.

The storage apparatus 203 has a database 205. The storage apparatus 203 stores various types of programs which are executed by the device management apparatus 20. In addition, the storage apparatus 203 stores files, data, etc., required to implement various types of functions of the device management apparatus 20. In addition, the storage apparatus 203 stores various types of management information parameters (device information) and a management program which are used to manage the devices 30 which are management targets. The database 205 stores various types of data such as data received from the information processing apparatuses 10 and the devices 30 on the device user side, data inputted from the operator's terminal 202, and programs. In addition, the database 205 stores various types of information on the devices 30. For example, various types of management information for managing the devices 30, such as customer information, the installation states of the devices 30, and areas allowed to install the devices 30, is held. Note that various types of management information are registered in advance based on contract information with customers. In addition, the database 205 has a parameter storage area 206 in its predetermined region. The parameter storage area 206 stores various types of parameters including line parameters and data inputted by an operator.

The control apparatus 204 includes a microcomputer composed of a CPU (Central Processing Unit), a ROM (Read Only Memory), a RAM (Random Access Memory), etc., which are not illustrated, and performs overall control of the operation of the device management apparatus 20. In addition, the CPU controls the overall operation of the device management apparatus 20 by executing a program stored in the storage apparatus 203. In addition, the CPU implements various types of functions. The control apparatus 204 has the function of receiving from the devices 30 device information (management information parameters) including at least state information indicating the states of the devices 30 and identification information identifying the devices 30, and controls the management of the devices 30 based on the device information. In addition, the control apparatus 204 controls communication performed by the proxy server 201. By the control apparatus 204 controlling the proxy server 201, the control apparatus 204 implements various types of functions, e.g., the functions of a software transmitting unit, a schedule generating unit, and a schedule transmitting unit.

In addition, the device management apparatus 20 has a display apparatus which is not illustrated. The display apparatus displays, for example, a GUI (Graphical User Interface) by a program. The display apparatus is, for example, a display that displays images, etc. The display is, for example, a liquid crystal or organic EL FPD (Flat Panel Display).

Note that the above-described programs for the device management apparatus 20 may be recorded and distributed as files in an installable format or an executable format in a computer-readable recording medium such as a recording medium.

Figure 7:
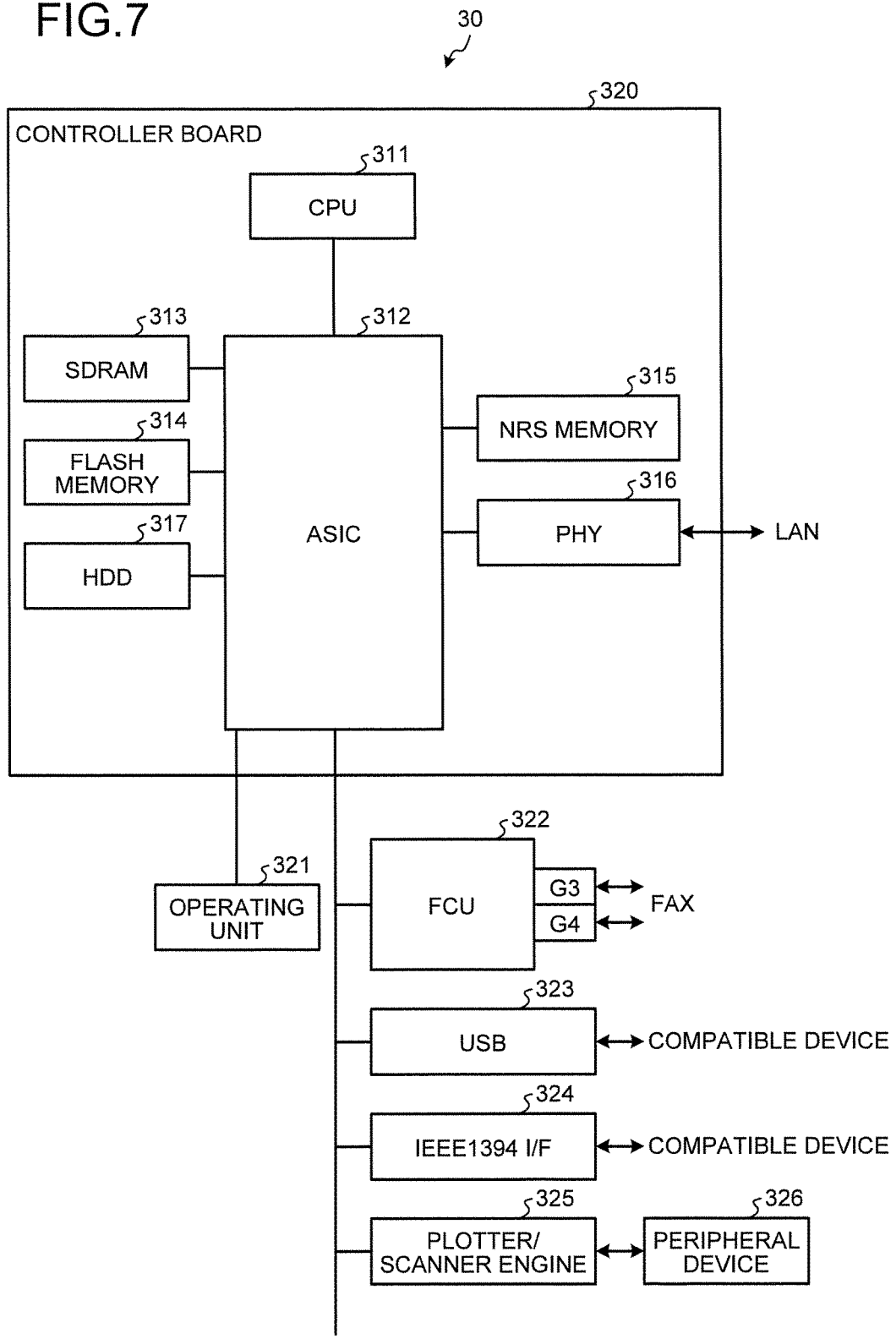
FIG. 7 is a diagram illustrating an example of a hardware configuration of a device according to the present embodiment.

Next, using FIG. 7, a hardware configuration of the device 30 will be described. FIG. 7 is a diagram illustrating an example of a hardware configuration of a device according to the present embodiment.

As illustrated in FIG. 7, the device 30 includes a controller board 320, an operating unit 321, an FCU (facsimile control unit) 322, a USB (Universal Serial Bus) 323, an IEEE1394 I/F 324, a plotter/scanner engine 325, and a peripheral device 326. Each of these units is a hardware resource of the device (image forming apparatus) 30. By turning on the power to the device 30 (power on), a CPU 311 starts a boot loader in a flash memory 314 via an ASIC 312, and reads an OS image in the flash memory 314 according to the boot loader and loads the OS image into an SDRAM 313 for expansion into a usable OS. Then, when the expansion of the OS is completed, the CPU 311 starts the OS. Thereafter, the CPU 311 reads, as necessary, programs such as an application and a service in the flash memory 314 or an NRS 331 in an NRS memory 315 and loads them into the SDRAM 313 for expansion and starts the programs, and can thereby implement various types of functions.

The controller board 320 includes the CPU (Central Processing Unit) 311, the ASIC (Application Specific Integrated Circuit) 312, the SDRAM (Synchronous Dynamic Random Access Memory) 313, the flash memory 314, the NRS memory 315, a PHY 316, and an HDD (Hard Disk Drive) 317.

The CPU 311 is an arithmetic processing unit that performs data processing (control of functions) through the ASIC 312. The CPU 311 performs overall control of the operation of the device 30. The CPU 311 controls the overall operation of the device 30 by executing programs stored in the SDRAM 313, the flash memory 314, and the HDD 317. In addition, the CPU 311 implements various types of functions. In addition, the CPU 311 performs processes of the device 30 by controlling each unit of the device 30 by performing data computing based on the programs in the SDRAM 313, the flash memory 314, and the HDD 317.

The ASIC 312 is a multifunction device board including a CPU I/F interface, an SDRAM interface, a local bus interface, a PCI interface, a MAC (Media Access Controller), an HDD interface, etc. The ASIC 312 aids to increase the efficiency of development of an application, etc., in terms of architectural aspects, through the shared use of devices to be controlled by the CPU 311. In addition, when the device 30 is an MFP, etc., the ASIC 312 performs various types of image processing.

The SDRAM 313 is a memory that stores various types of programs including an OS (Operating System). In addition, the SDRAM 313 is a main memory used as a working memory, etc., used when the CPU 311 performs data processing. Note that instead of the SDRAM 313, a DRAM or an SRAM may be used.

The flash memory 314 is a memory that stores various types of programs and an OS (Operating System) image. In addition, the flash memory 314 is a memory that stores data (a model/model number, an IP address, etc.) that requires various types of non-volatility. The flash memory 314 is also a storage memory for implementing the functions of the device management system 1. In addition, the flash memory 314 is a non-volatile memory (non-volatile storage unit) used as, for example, a fixed program memory that stores a boot loader (boot program) for stating the device (image forming apparatus) 30 and an OS image, an application memory that stores applications, a service memory that stores services (service software), a firmware memory that stores firmware, and a data memory that stores an address (network address) or a model/model number which is identification information of the device (image forming apparatus) whose operating status is to be monitored and managed, and counter information (data on a charging counter), and holds the stored information even if the power is turned off. Note that instead of the flash memory 314, a non-volatile RAM in which a RAM and a backup circuit using a battery are packaged, or other non-volatile memories such as an EEPROM may be used.

The NRS memory 315 is a non-volatile memory that stores the NRS 331 which will be described later. An NRS function can be optionally added to the NRS memory 315. In addition, the NRS memory 315 is a memory that stores various types of data required to implement the functions of a remote management process of the device management system 1.

The PHY 316 is an interface that connects to the proxy server of the device management apparatus 20 and an external apparatus through a local network and further through a network.

The HDD 317 is a non-volatile storage medium that stores and saves data regardless of on/off of the power. The HDD 317 stores various types of management information of the target device 30, update firmware, and execution firmware. In addition, when the device 30 is an MFP, etc., the HDD 317 stores image data, etc. The HDD 317 can also store the above-described programs in the flash memory 314 and other data. In addition, the HDD 317 can also be used as a firmware memory. In addition, when modulated data which is transmitted from the device management apparatus 20 is received, the HDD 317 demodulates the data.

The operating unit 321 is an interface for an operator that performs operations on an MFP which is the device 30. The operating unit 321 accepts data input, job execution, etc. In addition, the operating unit 321 includes various types of operating keys, function keys, and the like, and also includes a display (e.g., a liquid crystal display). Various types of commands, etc., required to allow the device 30 to perform various types of operation are inputted from the operating keys. The display displays the content of a command inputted from the operating keys, or various types of information notifying the operator by the device 30.

The FCU 322 controls, using a public line, communication with an image forming apparatus such as a FAX apparatus or a digital copier or a digital multifunction peripheral having a modem function (FAX communication function), and an external apparatus such as the device management apparatus 20. In addition, the FCU 322 exchanges facsimile control signals with an external FAX apparatus and performs facsimile communication procedures of G3 and G4.

The USB (Universal Serial Bus) 323 is a serial bus for connecting to a peripheral apparatus. In addition, a USB device is connected to the USB 323, and the USB 323 gives and receives data to/from the USB device connected thereto under the control of the CPU 311.

The IEEE1394 I/F 324 is used for connection with an external scanner, plotter, etc.

The plotter/scanner engine 325 prints out an image on paper based on image data received from the ASIC 312, and also main-scans/sub-scans a document to read image data of the document and outputs the image data to the ASIC 312. The peripheral device 326 such as a postprocessing device or an ADF (Automatic Document Feeder) is connected to the plotter/scanner engine 325. Note that the plotter/scanner engine 325 which is an engine unit includes therein a sensor for detecting events such as abnormality.

Figure 8:
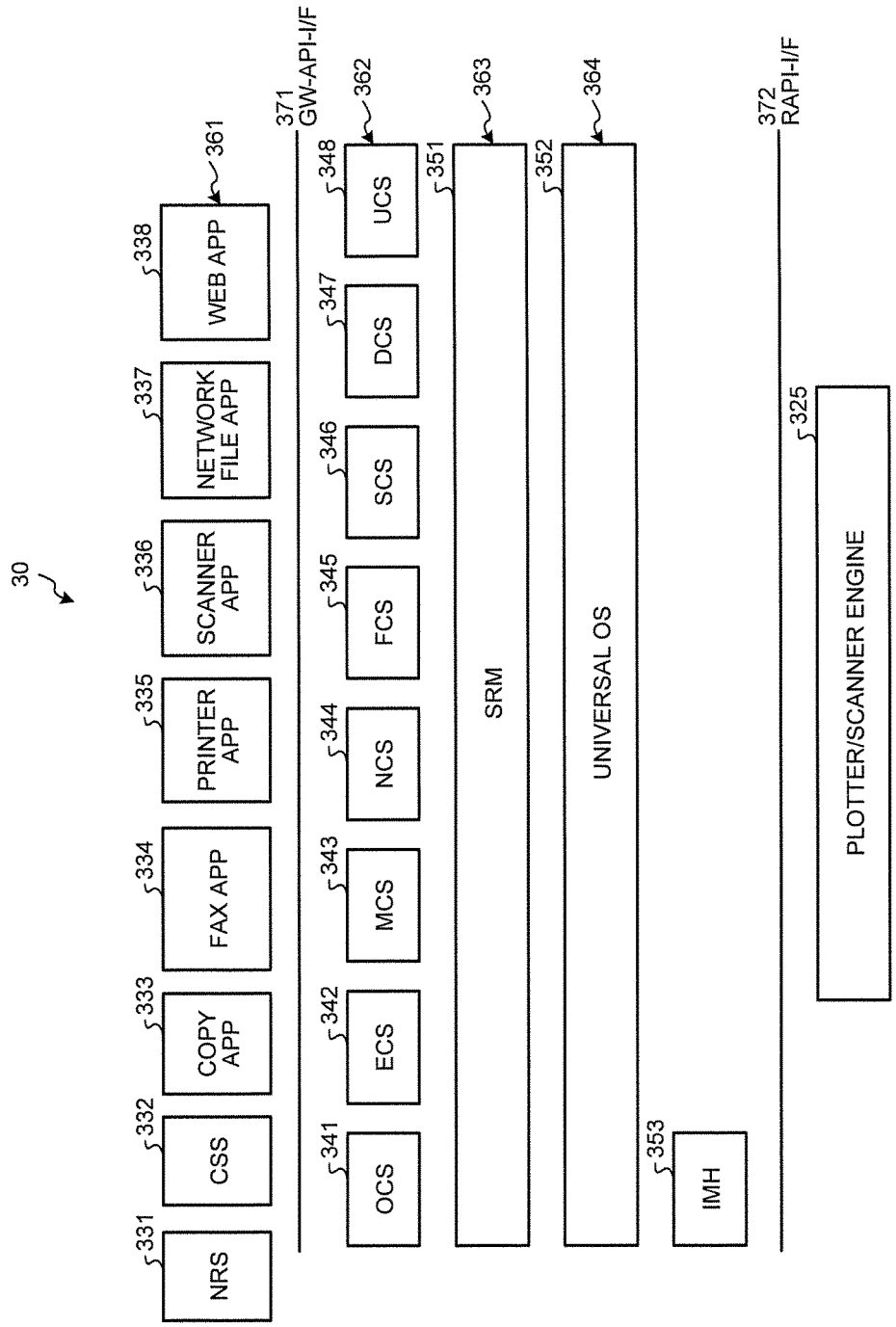
FIG. 8 is a diagram illustrating an example of a software configuration of the device according to the present embodiment.

Next, using FIG. 8, a software configuration of the device 30 of the present embodiment will be described. FIG. 8 is a diagram illustrating an example of a software configuration of a device.

As illustrated in FIG. 8, the device 30 is composed of an application module layer 361, a service module layer 362, an SRM (System Resource Manager) layer 363, a universal OS layer 364, and an IMH (Image Memory Handler) 353. The application module layer 361 and the service module layer 362 are functionally connected to each other by a GW-API-I/F 371. The service module layer 362 and the plotter/scanner engine 325 are connected to each other by an RAPI-I/F 372. The plotter/scanner engine 325 includes therein an abnormality detecting unit composed of a sensor, etc.

The device 30 starts these programs by the CPU 311 starting a boot program in the flash memory 314 via the ASIC 312. Furthermore, the CPU 311 reads an OS image and loads the OS image into the SDRAM 313 for expansion into an OS and starts the OS. Then, the device 30 further reads, as necessary, programs such as an application and a service in the flash memory 314 and loads the programs into the SDRAM 313 for expansion and starts the programs and thereby implements functions. Programs constituting these pieces of software are stored in the flash memory 314 or the NRS memory 315, and are read and executed by the CPU 311 as necessary. By the CPU 311 executing these programs as necessary, the CPU 311 implements various types of functions, e.g., the functions of a software updating unit, a responding unit, a grace period managing unit, a restart instructing unit, and a power-on notifying unit.

Software of the application module layer 361 is composed of a program for allowing the CPU 311 to function as a plurality of application control units (process performing units) that implement predetermined functions by allowing the hardware resources to operate. Software of the service module layer 362 is composed of a program for allowing the CPU 311 to function as a service control unit (process performing unit) that is interposed between the hardware resources and the application control units and that accepts operation requests to the hardware resources from the plurality of application control units, arbitrates the operation requests, and controls the performance of operation based on the operation requests. Note that, of those functions, a method of implementing a function related to communication with the device management apparatus 20 (the function of a communicating unit) differs between the device 30 and the information processing apparatus 10. That is, in the case of the device 30, by the CPU 311 executing a corresponding program and using the information processing apparatus 10, the function related to communication with the device management apparatus 20 can be implemented. In the case of the device 11 including an information processing apparatus, since the device 11 has the function of the information processing apparatus 10, by the CPU 311 executing a corresponding program, the function related to communication with the device management apparatus 20 can be implemented.

The application module layer 361 includes an NRS (New Remote Service) 331, a CSS 332, a copy app (hereinafter, the application is referred to as an "app" as necessary) 333, a fax app 334, a printer app 335, a scanner app 336, a network file app 337, and a web app 338.

The NRS 331 is an application having, for example, a function related to remote management of the device 30 through the communication network 70, e.g., performing data conversion when data is transmitted and received through the communication network 70, and a scheduler function. In addition, the NRS 331 has the function of notifying the device management apparatus 20 of state information indicating the state of the device 30, counter information, firmware version information, etc., and the function of transmitting requests such as firmware update and command execution on a per-method basis. In addition, the NRS 331 has the function of making an abnormality report of the device 30, a consumable order call, and a startup report to the device management apparatus 20 on a regular basis or immediately or on an irregular basis. The CSS 332 has a function related to remote management through the communication network 70 (a function related to communication with the device management apparatus 20), such as performing data conversion when data is transmitted and received through the communication network 70. The copy app 333, the fax app 334, the printer app 335, the scanner app 336, the network file app 337, and the web app 338 are, as the names indicate, applications that implement services including a copy function, a fax function, a printer function, a scanner function, a network file operation function, and a web service.

The service module layer 362 implements an OCS (Operation Control Service) 341, an ECS (Engine Control Service) 342, an MCS (Memory Control Service) 343, an NCS (Network Control Service) 344, an FCS (Fax Control Service) 345, an SCS (System Control Service) 346, a DCS (Delivery Control Service) 347, and a UCS (User Control Service) 348.

The OCS 341 is a module that controls the operating unit 321. The ECS 342 is a module that controls the plotter/scanner engine 325 such as hardware resources. The MCS 343 is a module that performs memory control. For example, the MCS 343 obtains and frees an image memory and uses the HDD 317. The NCS 344 is a module that performs an intermediary process between a network and each of the applications 331 to 338 of the application module layer 361. The FCS 345 is a module that implements a facsimile function. For example, the FCS 345 performs facsimile transmission and reception, facsimile reading, and facsimile reception and printing. The SCS 346 is a module that performs start management and end management of each of the applications 331 to 338 of the application module layer 361 according to the content of a command. The DCS 347 is a module that transmits and receives an image file stored in the HDD 317 or a memory on the controller board 320, using SMTP (Simple Mail Transfer Protocol) or FTP (File Transfer Protocol). The UCS 348 is a module that manages user information such as destination information registered by a user of the device 30 and destination information.

An SRM 351 is a module that performs system control and resource management. A universal OS 352 is an operating system such as UNIX (registered trademark) or LINUX (registered trademark). The SRM 351 performs the process of executing, for example, the programs of the service module layer 362 and the application module layer 361. Here, by using UNIX (registered trademark), security is ensured due to its open source, providing advantages such as easiness of obtaining source code. In addition, in network support, there are practical advantages such as protocol royalties become unnecessary. The IMH 353 is a module that manages a memory where image data is temporarily stored.

Figure 9:
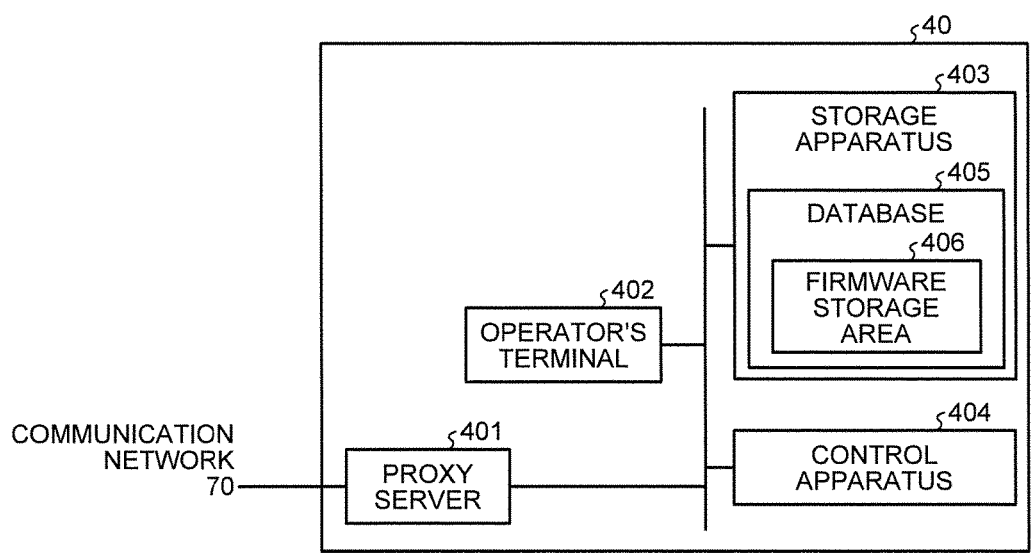
FIG. 9 is a diagram illustrating an example of a hardware configuration of a dynamic destination server according to the present embodiment.

Next, using FIG. 9, a hardware configuration of the dynamic destination server 40 will be described. FIG. 9 is a diagram illustrating an example of a hardware configuration of a dynamic destination server.

As illustrated in FIG. 9, the dynamic destination server 40 includes a proxy server 401, an operator's terminal 402, a storage apparatus 403, and a control apparatus 404.

The proxy server 401 is connected to the communication network 70. The proxy server 401 performs, for example, security management by performing communication with the information processing apparatuses 10 and the devices 30 on the device user side through the communication network 70. In addition, the proxy server 401 functions as a communicating unit.

The operator's terminal 402 is a user interface that is composed of, for example, pointing devices such as a keyboard and a mouse and a display and accepts user's various operation instructions. In addition, the operator's terminal 402 is an input interface that inputs various types of data. For the operator's terminal 402, for example, a touch panel or an audio input apparatus may serve as the operator's terminal 402.

The storage apparatus 403 has a database 405. The storage apparatus 403 stores various types of programs which are executed by the dynamic destination server 40. In addition, the storage apparatus 403 stores files, data, etc., required to implement various types of functions of the dynamic destination server 40. For example, the storage apparatus 403 stores data for performing data processing. The database 405 stores various types of data such as parameters for performing synchronous communication by the dynamic destination server 40, data inputted from the operator's terminal 402, and programs. In addition, the database 405 has a firmware storage area 406 in its predetermined region. The firmware storage area 406 stores update firmware (a new version of firmware) of the devices 30 and the devices 11 including an information processing apparatus. The firmware storage area 406 may also serve as a region that stores, in addition to firmware, information on various types of content which is notified to the devices 30, such as moving image information, setting information, and mapping information, and data for performing data processing.

The control apparatus 404 includes a microcomputer composed of a CPU (Central Processing Unit), a ROM (Read Only Memory), a RAM (Random Access Memory), etc., which are not illustrated, and performs overall control of the operation of the dynamic destination server 40. In addition, the CPU controls the overall operation of the dynamic destination server 40 by executing a program stored in the storage apparatus 403. In addition, the CPU implements various types of functions. In addition, the control apparatus 404 controls communication performed by the proxy server 401. By the control apparatus 404 controlling the proxy server 401, the control apparatus 404 implements various types of functions, e.g., the function of a data transmitting unit.

In addition, the dynamic destination server 40 has a display apparatus which is not illustrated. The display apparatus displays, for example, a GUI (Graphical User Interface) by a program. The display apparatus is, for example, a display that displays images, etc. The display is, for example, a liquid crystal or organic EL FPD (Flat Panel Display).

Note that the above-described programs for the dynamic destination server 40 may be recorded and distributed as files in an installable format or an executable format in a computer-readable recording medium such as a recording medium.

Note that a hardware configuration of the static destination server 50 is the same as that of the dynamic destination server 40 and thus a detailed description thereof is omitted.

Figure 10:
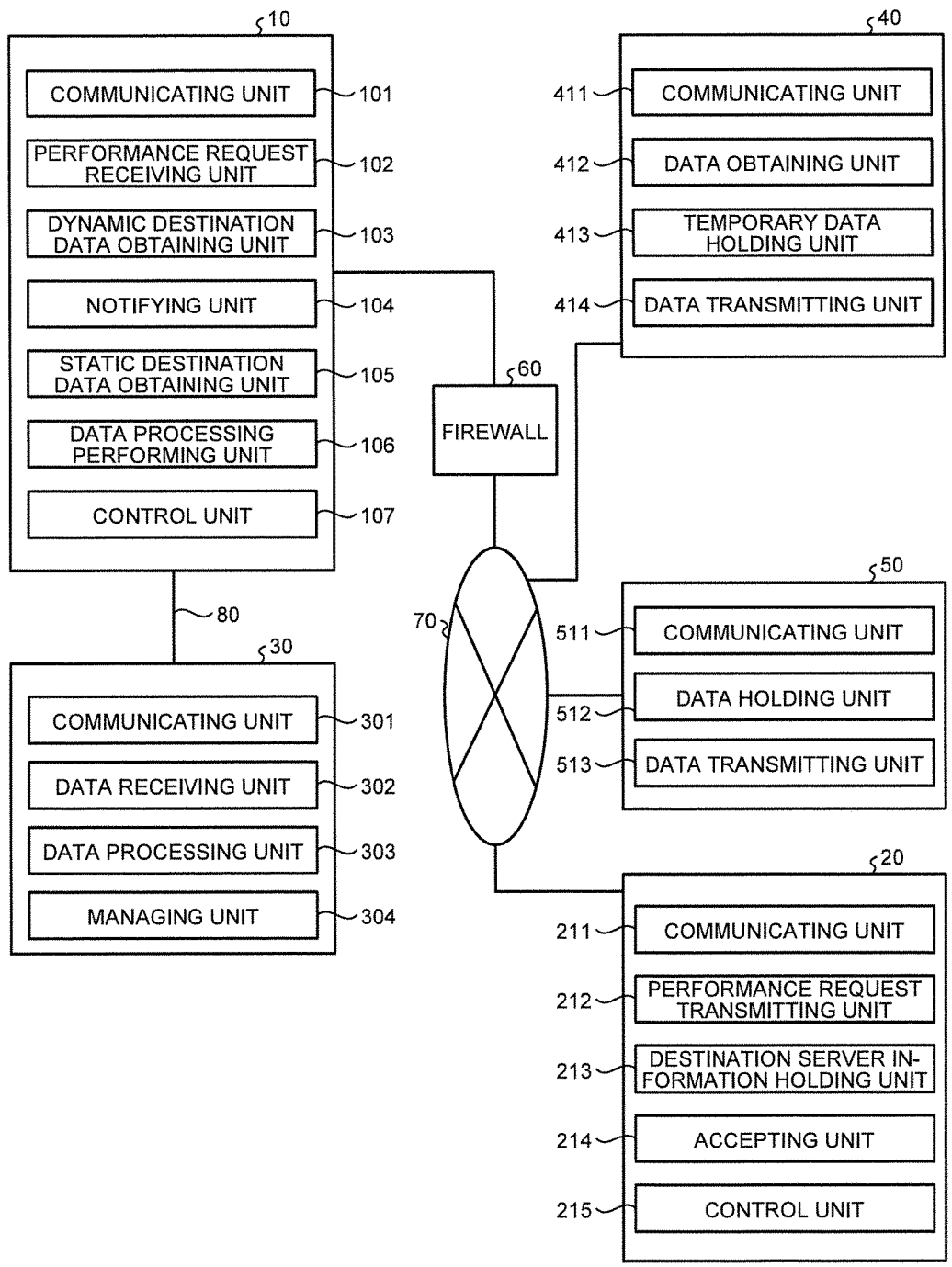
FIG. 10 is a block diagram illustrating an example of the functional configurations of the information processing apparatus, the device management apparatus, the device, the dynamic destination server, and a static destination server according to the present embodiment.

Next, using FIG. 10, the functions of the information processing apparatus 10, the device management apparatus 20, the device 30, the dynamic destination server 40, and the static destination server 50 of the present embodiment will be described. FIG. 10 is a block diagram illustrating an example of the functional configurations of an information processing apparatus, a device management apparatus, a device, a dynamic destination server, and a static destination server.

First, a functional configuration of the information processing apparatus 10 will be described. As illustrated in FIG. 10, the information processing apparatus 10 includes a communicating unit 101, a performance request receiving unit 102, a dynamic destination data obtaining unit 103, a notifying unit 104, a static destination data obtaining unit 105, a data processing performing unit 106, and a control unit 107. Some or all of the above-described units may be software (program) or a hardware circuit. In addition, some of the above-described units may be configured to be mounted on the information processing apparatus 10.

The communicating unit 101 communicates with a device 30 via a communication network 80. The communicating unit 101 transmits and receives various types of data to/from one or more devices 30 via communication networks 80. In addition, the communicating unit 101 communicates with the device management apparatus 20, one or more dynamic destination servers 40, and the static destination server 50 via the communication network 70. The communicating unit 101 transmits and receives various types of data to/from the device management apparatus 20, one or more dynamic destination servers 40, and the static destination server 50 via the communication network 70. Specifically, for example, the communicating unit 101 receives a performance request to perform data processing which includes identification information of a dynamic destination server 40 and identification information of the static destination server 50 and passes the performance request to the performance request receiving unit 102. In addition, for example, the communicating unit 101 receives data for performing data processing from a dynamic destination server 40 or the static destination server 50 and passes the data to the data processing performing unit 106.

The performance request receiving unit 102 receives a performance request to perform data processing which includes identification information identifying the static destination server 50 with a fixed destination and identification information identifying a dynamic destination server 40 with a dynamically changing destination. In addition, when data for performing data processing cannot be obtained after the performance request receiving unit 102 first receives a performance request which includes identification information identifying a dynamic destination server 40, the performance request receiving unit 102 next receives a performance request to perform data processing which includes identification information identifying the static destination server 50. The identification information identifying the static destination server 50 and the dynamic destination server 40 includes, for example, logical addresses that can identify the destination servers, e.g., IP addresses, domain names, or host names, but is not limited thereto. The identification information may be any as long as the identification information is accessible (identifiable) address information (identification information) that can identify the dynamic destination server 40 and the static destination server 50.

The dynamic destination data obtaining unit 103 transmits an obtaining request requesting to obtain data for performing data processing, to the dynamic destination server 40 using the identification information of the dynamic destination server 40 included in the performance request to perform data processing, and thereby obtains the data. Specifically, the dynamic destination data obtaining unit 103 transmits, for example, a data obtaining request to update firmware to the dynamic destination server 40 using, for example, an IP address of the dynamic destination server 40 with a dynamically changing destination which is included in the performance request received from the device management apparatus 20, and downloads, as a response thereto, update firmware (a new version of firmware) from the dynamic destination server 40. In addition, the dynamic destination data obtaining unit 103 identifies a destination address (i.e., an IP address) for connecting to the dynamic destination server 40 from a DNS server, using a domain name or a host name identifying the dynamic destination server 40, and transmits an obtaining request requesting to obtain data for performing data processing, to the dynamic destination server 40 and thereby obtains the data.

When there is no response to the data obtaining request from the dynamic destination server 40, determining that the data cannot be obtained from the dynamic destination server 40, the notifying unit 104 notifies the device management apparatus 20 that the data cannot be obtained from the dynamic destination server 40. In addition, after the dynamic destination data obtaining unit 103 transmits an obtaining request requesting to obtain data for performing data processing, to the dynamic destination server 40 using the identification information of the dynamic destination server 40 included in the performance request, it is determined that the data cannot be obtained, and the notifying unit 104 notifies the device management apparatus 20 that the data cannot be obtained.

When there is no response to the request to obtain data for performing data processing from the dynamic destination server 40, it is determined that the data cannot be obtained. Then, the static destination data obtaining unit 105 transmits an obtaining request requesting to obtain data for performing data processing, to the static destination server 50 using the identification information of the static destination server 50 included in the performance request, and thereby obtains the data. Specifically, the static destination data obtaining unit 105 transmits, for example, an update firmware data obtaining request to update firmware to the static destination server 50 using, for example, an IP address of the static destination server 50 with a uniquely fixed destination which is included in the performance request received from the device management apparatus 20, and downloads and obtains, as a response thereto, update firmware (a new version of firmware) from the static destination server 50. In addition, after the notifying unit 104 notifies the device management apparatus 20 that the data cannot be obtained, regarding the static destination server 50, an obtaining request requesting to obtain data for performing data processing is transmitted to the static destination server 50 using the identification information of the static destination server 50 included in a newly received performance request, and thereby the data is obtained as a response thereto.

The data processing performing unit 106 performs data processing using the obtained data for performing data processing. Specifically, when the data processing included in the performance request is, for example, a firmware update, the data processing performing unit 106 performs a firmware update process on devices 30 using obtained update firmware. The data processing performing unit 106, for example, transmits update firmware data to the devices 30 to cause the devices 30 to perform a firmware update process.

The control unit 107 controls the entire information processing apparatus 10. In addition, the control unit 107 performs overall control of the above-described processes of the functional units. In addition, when the information processing apparatus 10 performs data processing from itself, if the data processing is, for example, a firmware update process, the control unit 107 transmits an obtaining request requesting to obtain a destination of a server that holds update firmware, to the device management apparatus 20 through the communicating unit 101.

Next, a functional configuration of the device management apparatus 20 will be described. As illustrated in FIG. 10, the device management apparatus 20 includes a communicating unit 211, a performance request transmitting unit 212, a destination server information holding unit 213, an accepting unit 214, and a control unit 215. Some or all of the above-described units may be software (program) or a hardware circuit. In addition, some of the above-described units may be configured to be mounted on the information processing apparatus 10.

The communicating unit 211 communicates with an information processing apparatus 10 and a device 30 via the communication network 70. The communicating unit 211 transmits and receives various types of data to/from one or more devices 30 via an information processing apparatus 10 through the communication network 70. In addition, the communicating unit 211 communicates with the information processing apparatus 10 via the communication network 70. The communicating unit 211 transmits and receives various types of data to/from the information processing apparatus 10 via the communication network 70. Specifically, for example, the communicating unit 211 transmits, to the information processing apparatus 10, a performance request to perform data processing which includes identification information of a dynamic destination server 40 and identification information of the static destination server 50.

The performance request transmitting unit 212 transmits, to the information processing apparatus 10 or the devices 30, a performance request to perform data processing which includes identification information identifying the static destination server 50 with a fixed destination that holds data for performing various types of data processing, and identification information identifying a dynamic destination server 40 with a dynamically changing destination that temporarily holds the data held by the static destination server 50.

Specifically, the performance request transmitting unit 212 transmits, to the information processing apparatus 10 or the devices 30, for example, a performance request to perform a firmware update process which includes, for example, an IP address, a domain name, or a host name that identifies the static destination server 50 with a fixed destination, and for example, an IP address, a domain name, or a host name that identifies a dynamic destination server 40 with a dynamically changing destination.

In addition, when the accepting unit 214 accepts a notification indicating that data for performing data processing cannot be obtained, after a performance request is first transmitted which includes identification information identifying a dynamic destination server 40, the performance request transmitting unit 212 next transmits a performance request to perform data processing which includes identification information identifying the static destination server 50.

The destination server information holding unit 213 holds, for example, identification information of one or more dynamic destination servers 40 with dynamically changing destinations and the static destination server 50 with a uniquely fixed destination. The identification information held by the destination server information holding unit 213 includes, for example, logical addresses that can identify the destination servers, e.g., IP addresses, domain names, or host names, but is not limited thereto. The identification information may be any as long as the identification information is accessible (identifiable) address information (identification information) that can identify the dynamic destination servers 40 and the static destination server 50. In addition, the destination server information holding unit 213 holds information such as the content of data for performing data processing which is held by the static destination server 50. Note that the data held by the static destination server 50 includes, for example, content information including information such as firmware of the devices 30, update firmware, device setting information, large-scale setting information, mapping information, navigation information, image files, and moving image files, but is not limited thereto and is any.

The accepting unit 214 accepts, from the information processing apparatus 10, a notification indicating that data for performing data processing cannot be obtained. Specifically, when the information processing apparatus 10 determines that data cannot be obtained, after transmitting an obtaining request requesting to obtain data for performing data processing to the dynamic destination server 40 using the identification information of the dynamic destination server 40 included in the performance request to perform data processing, and thus notifies that the data cannot be obtained, the accepting unit 214 accepts a notification indicating that the data cannot be obtained.

The control unit 215 controls the entire device management apparatus 20. In addition, the control unit 215 performs overall control of the above-described processes of the functional units.

Next, a functional configuration of the device 30 will be described. Note that an example in which the device 30 is an MFP which is a network device is described. As illustrated in FIG. 10, the device 30 includes a communicating unit 301, a data receiving unit 302, a data processing unit 303, and a managing unit 304. Some or all of the above-described units may be software (program) or a hardware circuit. In addition, some of the above-described units may be configured to be mounted on the device 30.

The communicating unit 301 communicates with an information processing apparatus 10 through a communication network 80 to transmit and receive various types of data to/from the information processing apparatus 10. In addition, the communicating unit 301 communicates with the device management apparatus 20 to transmit and receive various types of data to/from the device management apparatus 20. Specifically, the communicating unit 301 receives data for performing data processing from the information processing apparatus 10. In addition, for example, when the device 30 performs data processing from itself, if the data processing is, for example, a firmware update process, the communicating unit 301 transmits an obtaining request requesting to obtain a destination of a server that holds update firmware, to the device management apparatus 20 through the information processing apparatus 10.

The data receiving unit 302 receives data for performing data processing from the information processing apparatus 10. The data receiving unit 302 passes the received data to the data processing unit.

The data processing unit 303 performs data processing using the data for performing data processing which is received from the information processing apparatus 10. Specifically, for example, if the data processing is, for example, a firmware update process, the data processing unit 303 performs its firmware update process using received update firmware.

The managing unit 304 transmits device information in which state information indicating the state of the device 30 is associated with a device ID identifying the device 30, to the device management apparatus 20 via the information processing apparatus 10. In addition, the managing unit 304 receives, for example, management service information including a management item and a service which are determined by the device management apparatus 20, from the device management apparatus 20 through the information processing apparatus 10. In addition, when the managing unit 304 accepts a setting request to allow for remote management and thus enables the remote management function and thereafter accepts management service information, the managing unit 304 holds the management service information and notifies the device management apparatus 20 of device information including state information indicating the state of the device 30 through the information processing apparatus 10, based on a service and a management item included in the management service information. Specifically, the managing unit 304 notifies the device management apparatus 20 of device information including state information indicating the state of the device 30, based on a device information notification interval included in the management item of the management service information. Note that the management service information includes, for example, a management item such as the data size (the amount of data) of device information, the notification timing of various types of device information, or a device information notification interval, and a service indicating a function provided to manage the device 30, such as a lamp change call, a failure notification, a part order call, a consumable order call, or a firmware update. In addition, the device information includes, for example, individual information such as a model/model number, option placement information such as a sorter or a finisher, various types of counter information such as the total number of copies, the number of monochrome copies, and the number of color copies, device state information (history information) such as the number of failures, repaired parts, and the number of repairs, and device setting information such as service person (SP) settings which are set, for example, when the device 30 is installed or user settings which are arbitrarily set by a user. The state information indicating the state of the device 30 includes, for example, counter information, device state information, and device setting information. In addition, the managing unit 304 holds the types of services provided which are included in management service information.

Next, a functional configuration of the dynamic destination server 40 will be described. As illustrated in FIG. 10, the dynamic destination server 40 includes a communicating unit 411, a data obtaining unit 412, a temporary data holding unit 413, and a data transmitting unit 414. Some or all of the above-described units may be software (program) or a hardware circuit. In addition, some of the above-described units may be configured to be mounted on the dynamic destination server 40.

The communicating unit 411 communicates with an information processing apparatus 10 through the communication network 70 to transmit and receive various types of data to/from the information processing apparatus 10. Specifically, the communicating unit 411 receives an obtaining request requesting to obtain data for performing data processing, from the information processing apparatus 10. In addition, the communicating unit 411 communicates with the static destination server 50 through the communication network 70 to receive original data held by the static destination server 50.

The data obtaining unit 412 obtains original data for performing data processing held by the static destination server 50 which will be described later. Specifically, the data obtaining unit 412 transmits an obtaining request requesting to obtain data for performing data processing, to the static destination server 50 and receives the data from the static destination server 50 as a response thereto, and thereby obtains the data. The data obtaining unit 412 passes the obtained data to the temporary data holding unit 413. The data obtaining unit 412 receives a notification when the data held by the static destination server 50 is updated or when new data is added, and newly obtains data. Note that the data obtaining unit 412 may obtain data at predetermined intervals, and the data obtaining timing is any.

The temporary data holding unit 413 temporarily holds data for performing data processing which is obtained by the data obtaining unit 412. That is, the temporary data holding unit 413 obtains and caches data on content information held by the static destination server 50.

When an obtaining request requesting to obtain data for performing data processing is received from the information processing apparatus 10, the data transmitting unit 414 transmits, as a response thereto, the data indicated in the obtaining request to the information processing apparatus 10.

Next, a functional configuration of the static destination server 50 will be described. As illustrated in FIG. 10, the static destination server 50 includes a communicating unit 511, a data holding unit 512, and a data transmitting unit 513. Some or all of the above-described units may be software (program) or a hardware circuit. In addition, some of the above-described units may be configured to be mounted on the static destination server 50.

The communicating unit 511 communicates with an information processing apparatus 10 through the communication network 70 to transmit and receive various types of data to/from the information processing apparatus 10. Specifically, the communicating unit 511 receives an obtaining request requesting to obtain data for performing data processing, from the information processing apparatus 10.

The data holding unit 512 holds original data for performing data processing. When data is added or data is updated, the data holding unit 512 holds the added or updated data. In addition, when data is added or data is updated, the data holding unit 512 notifies the dynamic destination servers 40 of information on the addition or update through the communicating unit 511.

When an obtaining request requesting to obtain data for performing data processing is received from the information processing apparatus 10, the data transmitting unit 513 transmits, as a response thereto, the data included in the obtaining request to the information processing apparatus 10.

Figure 11:
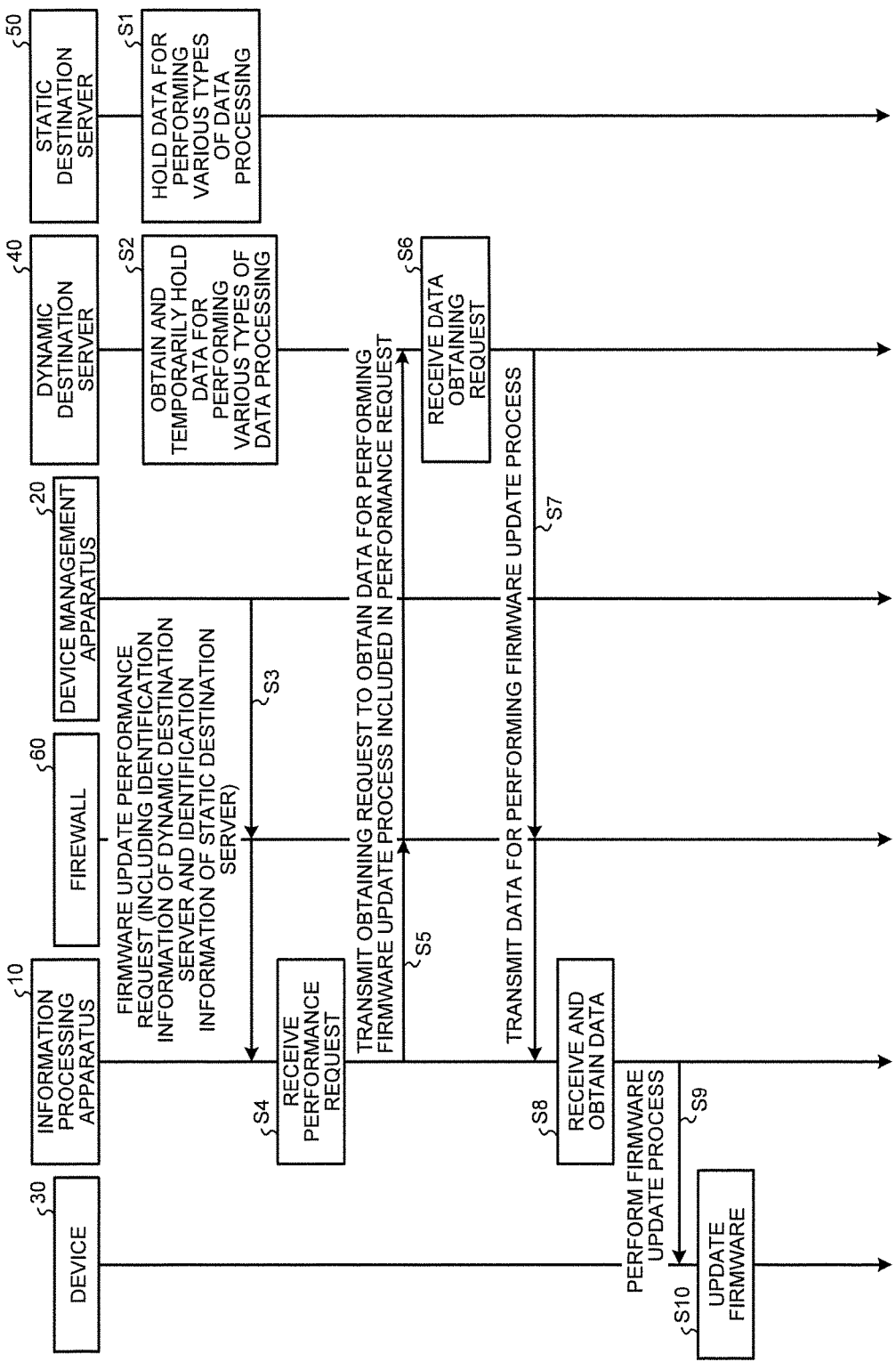
FIG. 11 is a sequence diagram of a process performed when a firmware update request is issued from the device management apparatus to the information processing apparatus with a customer's installation environment free from communication restrictions with any firewall.

Next, with reference to FIG. 11, an example of processing operation will be described which is performed when a firmware update request is issued from the device management apparatus 20 to an information processing apparatus 10 with a customer's installation environment free from communication restrictions with any firewall. FIG. 11 is a sequence diagram of a process performed when a firmware update request is issued from a device management apparatus to an information processing apparatus with a customer's installation environment free from communication restrictions with any firewall.

First, the static destination server 50 holds data for performing various types of data processing (step S1). A dynamic destination server 40 obtains the data for performing various types of data processing from the static destination server 50 and temporarily holds the data (step S2).

Then, the device management apparatus 20 transmits, to the information processing apparatus 10, a firmware update performance request including identification information (e.g., an IP address) of the dynamic destination server 40 and identification information (e.g., an IP address) of the static destination server 50 (step S3). The information processing apparatus 10 receives the firmware update performance request from the device management apparatus 20 (step S4).

To obtain data for performing a firmware update process indicated in the received performance request, the information processing apparatus 10 transmits an obtaining request requesting to obtain data for performing a firmware update process, to the dynamic destination server 40 using the identification information of the dynamic destination server 40 (step S5).

The dynamic destination server 40 receives the data obtaining request from the information processing apparatus 10 (step S6). Then, the dynamic destination server 40 transmits the data for performing a firmware update process indicated in the data obtaining request, to the information processing apparatus 10 (step S7).

The information processing apparatus 10 receives and obtains the data for performing a firmware update process (step S8). Then, the information processing apparatus 10 performs a firmware update process on a device 30 using the data for performing a firmware update process (step S9). The device 30 receives the data for performing a firmware update process and performs a firmware update (step S10). Then, the process ends.

As such, when the customer's installation environment is free from communication restrictions with any firewall, even when a dynamic destination server is newly installed in a remote management system to distribute the server load, a remote device management service can be provided to a customer.

Next, with reference to FIG. 12, an example of processing operation will be described which is performed when a destination server obtaining request to update firmware is issued from an information processing apparatus 10 to the device management apparatus 20 with a customer's installation environment free from communication restrictions with any firewall. Namely, in the following, first, the information processing apparatus 10 determines and performs a firmware update from itself. A specific description is made below.

Figure 12:
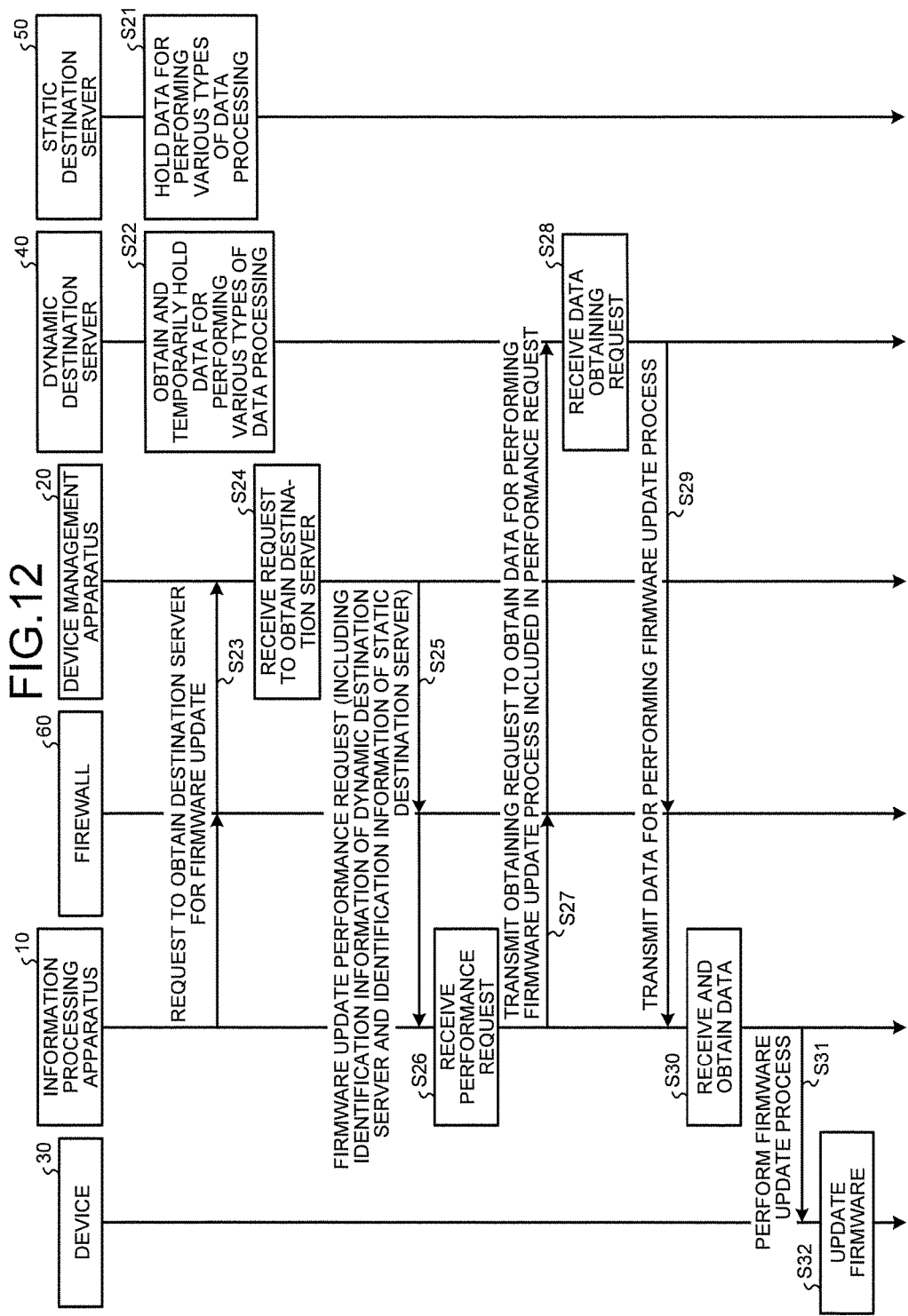
FIG. 12 is a sequence diagram of a process performed when a destination server obtaining request to update firmware is issued from the information processing apparatus to the device management apparatus with a customer's installation environment free from communication restrictions with any firewall.

FIG. 12 is a sequence diagram of a process performed when a destination server obtaining request to update firmware is issued from an information processing apparatus to a device management apparatus with a customer's installation environment free from communication restrictions with any firewall. Note that a description of the same steps as those described using FIG. 11 is omitted. Specifically, the contents of steps S21, S22, and S25 to S32 illustrated in FIG. 12 are the same as those of steps S1, S2, and S3 to S10 illustrated in FIG. 11. Thus, only steps S23 to S25 will be described.

First, after the processes at steps S21 and S22, next, the information processing apparatus 10 transmits an obtaining request requesting to obtain identification information of a destination server for a firmware update, to the device management apparatus 20 (step S23).

The device management apparatus 20 receives the obtaining request requesting to obtain identification information of a destination server (step S24).

The device management apparatus 20 transmits a firmware update performance request including identification information (e.g., an IP address) of the dynamic destination server 40 and identification information (e.g., an IP address) of the static destination server 50, to the information processing apparatus 10 (step S25). Thereafter, the processes at steps S26 to S32 are performed.

As such, when the customer's installation environment is free from communication restrictions with any firewall, a new dynamic destination server can be specified on a priority basis in response to a request to obtain a destination of a destination server from a customer's information processing apparatus 10. Thus, by an increase in download speed, a remote device management service can be improved.

Next, with reference to FIG. 13, an example of processing operation will be described which is performed when a firmware update request is issued from the device management apparatus 20 to an information processing apparatus 10 with a customer's installation environment having communication restrictions with a firewall. FIG. 13 is a sequence diagram of a process performed when a firmware update request is issued from a device management apparatus to an information processing apparatus with a customer's installation environment having communication restrictions with the firewall.

First, the static destination server 50 holds data for performing various types of data processing (step S41). A dynamic destination server 40 obtains the data for performing various types of data processing from the static destination server 50 and temporarily holds the data (step S42).

Then, the device management apparatus 20 transmits, to the information processing apparatus 10, a firmware update performance request including identification information (e.g., an IP address) of the dynamic destination server 40 and identification information (e.g., an IP address) of the static destination server 50 (step S43). The information processing apparatus 10 receives the firmware update performance request from the device management apparatus 20 (step S44).

To obtain data for performing a firmware update process indicated in the received performance request, the information processing apparatus 10 transmits an obtaining request requesting to obtain data for performing a firmware update process, to the dynamic destination server 40 using the identification information of the dynamic destination server 40 (step S45).

Here, since the customer's installation environment has communication restrictions with the firewall, a connection to the dynamic destination server 40 is blocked by the firewall and thus communication cannot be performed. Hence, when there is no response to the data obtaining request from the dynamic destination server 40 (step S46), the information processing apparatus 10 determines that the data cannot be obtained (step S47).

Then, the information processing apparatus 10 transmits an obtaining request requesting to obtain data for performing a firmware update process, to the static destination server 50 using the identification information of the static destination server 50 included in the performance request (step S48).

The static destination server 50 receives the data obtaining request from the information processing apparatus 10 (step S49). Then, the static destination server 50 transmits the data for performing a firmware update process indicated in the data obtaining request, to the information processing apparatus 10 (step S50).

The information processing apparatus 10 receives and obtains the data for performing a firmware update process (step S51). Then, the information processing apparatus 10 performs a firmware update process on a device 30 using the data for performing a firmware update process (step S52). The device 30 receives the data for performing a firmware update process and performs a firmware update (step S53). Then, the process ends.

As such, when the customer's installation environment has communication restrictions with a firewall, a performance request including both of the identification information of the dynamic destination server 40 and the identification information of the static destination server 50 is transmitted and a connection with the dynamic destination server 40 is established first on a priority basis. When data cannot be downloaded, by connecting to the static destination server 50 with a fixed destination that is free from communication restrictions with any firewall, data can be downloaded. Hence, a remote device management service can be provided as with conventional cases even to customers that currently have communication restrictions with a firewall and even when a dynamic destination server is newly installed in a remote management system.

Next, with reference to FIG. 14, another example of processing operation will be described which is performed when a firmware update request is issued from the device management apparatus 20 to an information processing apparatus 10 with a customer's installation environment having communication restrictions with a firewall. FIG. 14 is a sequence diagram of another process performed when a firmware update request is issued from a device management apparatus to an information processing apparatus with a customer's installation environment having communication restrictions with the firewall. Note that a description of the same steps as those described using FIG. 13 is omitted. Specifically, the contents of steps S61, S62, and S72 to S77 illustrated in FIG. 14 are the same as those of steps S41, S42, and S48 to S53 illustrated in FIG. 13. Thus, only steps S63 to S72 will be described.

First, after the processes at steps S61 and S62, the device management apparatus 20 transmits a firmware update performance request including identification information (e.g., an IP address) of the dynamic destination server 40, to the information processing apparatus 10 (step S63). The information processing apparatus 10 receives the firmware update performance request from the device management apparatus 20 (step S64).

To obtain data for performing a firmware update process indicated in the received performance request, the information processing apparatus 10 transmits an obtaining request requesting to obtain data for performing a firmware update process, to the dynamic destination server 40 using the identification information of the dynamic destination server 40 (step S65).

Here, since the customer's installation environment has communication restrictions with the firewall, a connection to the dynamic destination server 40 is blocked by the firewall and thus communication cannot be performed. Hence, when there is no response to the data obtaining request from the dynamic destination server (step S66), the information processing apparatus 10 determines that the data cannot be obtained (step S67).

The information processing apparatus 10 notifies the device management apparatus 20 that the data cannot be obtained from the dynamic destination server 40 (step S68). The device management apparatus 20 receives from the information processing apparatus 10 a notification indicating that the data cannot be obtained from the dynamic destination server 40 (step S69).

Then, the device management apparatus 20 transmits a performance request to perform data processing which includes identification information identifying the static destination server 50, to the information processing apparatus 10 (step S70).

The information processing apparatus 10 receives from the device management apparatus 20 the performance request to perform data processing which includes identification information identifying the static destination server 50 (step S71). Then, the information processing apparatus 10 transmits an obtaining request requesting to obtain data for performing a firmware update process, to the static destination server 50 using the identification information of the static destination server 50 included in the performance request (step S72). Thereafter, the processes at steps S73 to S77 are performed.

As such, when the customer's installation environment has communication restrictions with a firewall, first, a performance request including the identification information of the dynamic destination server 40 is first transmitted to establish a connection with the dynamic destination server

40 on a priority basis. When a notification indicating that data cannot be downloaded is received, next, a performance request including the identification information of the static destination server 50 with a fixed destination that is free from communication restrictions with any firewall is transmitted, by which data can be downloaded from the static destination server 50. Hence, a remote device management service can be provided as with conventional cases even to customers that currently have communication restrictions with a firewall and even when a dynamic destination server is newly installed in a remote management system.

As described above, according to the present embodiment, when the device management apparatus 20 allows an information processing apparatus 10 to perform, for example, a firmware update process as data processing, the device management apparatus 20 transmits a performance request including both of the identification information of a dynamic destination server 40 and the identification information of the static destination server 50. The information processing apparatus 10 establishes a connection with the dynamic destination server 40 first on a priority basis. When data cannot be downloaded, the information processing apparatus 10 can download data by connecting to the static destination server 50 with a fixed destination that is free from communication restrictions with any firewall. By this, an advantageous effect can be achieved that a remote device management service can be provided as with conventional cases even to customers that currently have communication restrictions with a firewall and even when a dynamic destination server is newly installed in a remote management system.

Although the embodiment according to the present invention has been described above, the present invention is not limited to the above-described embodiment as it is. In the implementation stage, the components may be modified and embodied without departing from the spirit of the present invention. In addition, various inventions may be formed by appropriately combining a plurality of components disclosed in the above-described embodiment. For example, some components may be deleted from all of the components described in the embodiment. Furthermore, components described in different embodiments may be appropriately combined together.

For example, the above-described performance request transmitting unit 212, dynamic destination data obtaining unit 103, static destination data obtaining unit 105, and data processing performing unit 106 may be configured to be mounted on each of the information processing apparatus 10, the device management apparatus 20, and the device 30 in a distributed manner. In addition, for example, the above-described performance request transmitting unit 212, dynamic destination data obtaining unit 103, static destination data obtaining unit 105, and data processing performing unit 106 may be configured to be mounted on each of the information processing apparatus 10, the device management apparatus 20, the device 30, and one or more external apparatuses (e.g., server apparatuses) in a distributed manner.

In addition, programs executed by the device management system 1 of the above-described embodiments may be configured to be recorded and provided as files in an installable format or an executable format in a computer-readable recording medium such as a CD-ROM, a flexible disk (FD), a CD-R, a DVD (Digital Versatile Disk), or a USB (Universal Serial Bus) or may be configured to be provided or distributed via a network such as the Internet. In addition, various types of programs may be configured to be preinstalled and provided in a ROM, etc.

Note that a system configuration of the present embodiment in which the information processing apparatuses 10 and the device management apparatus 20 are connected to the devices 30, the dynamic destination servers 40, and the static destination server 50 is an example, and thus needless to say, there are various exemplary system configurations according to the application or purpose.

According to an embodiment, an advantageous effect is provided that, even when customers have communication restrictions with a firewall, data such as firmware can be downloaded.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A device management system including: an information processing apparatus including a first processor to execute one or more programs of executable instructions embodied in a non-transitory computer readable medium, to configure the information processing apparatus to communicate with a device, and a device management apparatus including a second processor to execute one or more programs of executable instructions embodied in a non-transitory computer readable medium, to configure the device management apparatus to communicate with the information processing apparatus through a first communication network to manage the device, the information processing apparatus and device management apparatus of the device management system collectively performing a method comprising:

(a) transmitting by the device management apparatus to the information processing apparatus, a first performance request to perform device management processing, the first performance request including identification information identifying a dynamic destination server with a dynamically changing destination;

(b) receiving by the information processing apparatus the first performance request transmitted in (a), and transmitting to the dynamic destination server, using the identification information of the dynamic destination server included in the first performance request, an obtaining request requesting to obtain data being temporarily held by the dynamic destination server for performing the device management processing;

(c) determining, by the information processing apparatus, when there is no response from the dynamic destination server to the obtaining request transmitted in (b), that the data being temporarily held by the dynamic destination server cannot be obtained;

(d) transmitting by the device management apparatus to the information processing apparatus, after the information processing apparatus determines in (c) that there is no response from the dynamic destination server to the obtaining request transmitted in (b), a second performance request including identification information identifying a static destination server with a fixed destination, the static destination server holding data for performing various types of device management processing, the data temporarily held by the dynamic destination server being the same as the data held by the static destination server;

(e) receiving, by the information processing apparatus, the second performance request transmitted in (d) and transmitting an obtaining request to the static destination server using the identification information of the static destination server included in the second performance request, to obtain the data being held by the static destination server; and (f) performing by the information processing apparatus, device management processing, using, when the data being temporarily held by the dynamic destination server cannot be obtained, the data obtained in (e) from the static destination server.

2. The device management system according to claim 1, wherein the method performed by the information processing apparatus and device management apparatus collectively further comprises:

transmitting, by the information processing apparatus, a notification indicating that the data being temporarily held by the dynamic destination server cannot be obtained from the dynamic destination server, when it is determined in (c) that the data being temporarily held by the dynamic destination server cannot be obtained from the dynamic destination server; and receiving, by the device management apparatus, the notification indicating that the data being temporarily held by the dynamic destination server cannot be obtained, the notification being received after the device management apparatus first transmits the first performance request in (a) including the identification information identifying the dynamic destination server, and the device management apparatus next transmits the second performance request in (d) to perform the device management processing including the identification information identifying the static destination server, when it is determined that the data being temporarily held by the dynamic destination server cannot be obtained, after the obtaining request requesting to obtain the data being temporarily held by the dynamic destination server for performing the device management processing is transmitted in (b), to the dynamic destination server using the identification information of the dynamic destination server included in the first performance request, the notification indicating that the data being temporarily held by the dynamic destination server cannot be obtained is transmitted by the information processing apparatus, and the information processing apparatus next transmits the obtaining request requesting to obtain the data being held by the static destination server, to the static destination server using the identification information of the static destination server included in the second performance request received in (e), to obtain the data being held by the static destination server.

3. The device management system according to claim 1, wherein the identification information identifying the dynamic destination server indicates one of a domain name and a host name, and the method performed by the information processing apparatus and device management apparatus collectively further comprises identifying, by the information processing apparatus, a destination address for connecting to the dynamic destination server from a Domain Name System (DNS) server, using said one of the domain name and the host name and upon connecting to the dynamic destination server, transmitting in (b) the obtaining request requesting to obtain the data being temporarily held by the dynamic destination server for performing the device management processing to the dynamic destination server, to obtain the data being temporarily held by the dynamic destination server.

4. The device management system according to claim 1, wherein the device communicates with the information processing apparatus through a second communication network different than the first communication network; and one or more dynamic destination servers and the static destination server communicate with the information processing apparatus through the first communication network, wherein each server amongst the dynamic destination server and the static destination server includes a processor to execute one or more programs of executable instructions embodied in a non-transitory computer readable medium to configure the server to perform a method comprising:

holding the data for performing the various types of device management processing;

obtaining the data being held by the static destination server;

temporarily holding the obtained data; and transmitting the obtained, temporarily held data to the information processing apparatus when an obtaining request requesting to obtain the obtained, temporarily held data is received; and the device includes a processor to execute one or more programs of executable instructions embodied in a non-transitory computer readable medium, to configure the device to perform a method comprising:

receiving the obtained, temporarily held data transmitted to the information processing apparatus for performing the device management processing; and performing data processing using the received data.

5. The device management system according to claim 1, wherein a firmware update of the device is executed when the device management processing is performed.

6. The device management system according to claim 1, wherein it is determined in (c) that the data being temporarily held by the dynamic destination server cannot be obtained, when a firewall located within an installation environment of the information processing apparatus blocks a connection between the information processing apparatus and the dynamic destination server.

7. A device management system including: an information processing apparatus including a first processor to execute one or more programs of executable instructions embodied in a non-transitory computer readable medium, to configure the information processing apparatus to communicate with a device, and a device management apparatus including a second processor to execute one or more programs of executable instructions embodied in a non-transitory computer readable medium, to configure the device management apparatus to communicate with the information processing apparatus through a first communication network to manage the device, wherein the device management apparatus and information processing apparatus of the device management system collectively perform a method comprising:

(a) transmitting by the device management apparatus to the information processing apparatus a first performance request to perform device management processing, the first performance request including identification information identifying a dynamic destination server with a dynamically changing destination;

(b) receiving by the information processing apparatus the first performance request transmitted in (a), and transmitting to the dynamic destination server, using the identification information of the dynamic destination server included in the first performance request, an obtaining request requesting to obtain data being temporarily held by the dynamic destination server for performing the device management processing;

(c) determining, by the information processing apparatus, when there is no response from the dynamic destination server to the obtaining request transmitted in (b), that the data being temporarily held by the dynamic destination server cannot be obtained;

(d) transmitting by the device management apparatus to the information processing apparatus, after the information processing apparatus determines in (c) that there is no response from the dynamic destination server to the obtaining request transmitted in (b), a second performance request including identification information identifying a static destination server with a fixed destination, the static destination server holding data for performing various types of device management processing, the data temporarily held by the dynamic destination server being the same as the data held by the static destination server, (e) receiving, by the information processing apparatus, the second performance request transmitted in (d) and transmitting an obtaining request to the static destination server using the identification information of the static destination server included in the second performance request, to obtain the data being held by the static destination server; and (f) performing by the information processing apparatus, device management processing, using, when the data being temporarily held by the dynamic destination server cannot be obtained in (e), the data obtained from the static destination server.

8. The device management system according to claim 7, wherein the method performed by the information processing apparatus and device management apparatus collectively further comprises receiving, by the device management apparatus, a notification indicating that the data being temporarily held by the dynamic destination server cannot be obtained, the notification being received after the device management apparatus first transmits the first performance request in (a) including the identification information identifying the dynamic destination server, the device management apparatus next transmitting the second performance request in (d) to perform the device management processing including the identification information identifying the static destination server; and transmitting, by the information processing apparatus, the notification indicating that the data being temporarily held by the dynamic destination server cannot be obtained from the dynamic destination server, when it is determined in (c) that the data cannot be obtained from the dynamic destination server, when it is determined that the data being temporarily held by the dynamic destination server cannot be obtained, after the obtaining request requesting to obtain the data being temporarily held by the dynamic destination server for performing the device management processing is transmitted in (b), to the dynamic destination server using the identification information of the dynamic destination server included in the first performance request, the notification to the device management apparatus indicating that the data being temporarily held by the dynamic destination server cannot be obtained is transmitted by the information processing apparatus, and the information processing apparatus next transmits the obtaining request to the static destination server using the identification information of the static destination server included in the second performance request received in (e), to obtain the data being held in the static destination server.

9. The device management system according to claim 7, wherein the identification information identifying the dynamic destination server indicates one of a domain name and a host name, and the method performed by the information processing apparatus and device management apparatus collectively further comprises identifying, by the information processing apparatus, a destination address for connecting to the dynamic destination server from a Domain Name System (DNS) server, using said one of the domain name and the host name and upon connecting to the dynamic destination server, transmitting in (b) the obtaining request requesting to obtain the data being held in the static destination server for performing the device management processing to the dynamic destination server, to obtain the data being held in the static destination server.

10. The device management system according to claim 7, wherein the device communicates with the information processing apparatus through a second communication network different than the first communication network; and one or more dynamic destination servers and the static destination server communicate with the information processing apparatus through the first communication network, wherein the static destination server includes a processor to execute one or more programs of executable instructions embodied in a non-transitory computer readable medium, to configure the static destination server to perform a method comprising:

communicating with the information processing apparatus;

holding the data being held by the static destination server for performing the device management processing; and transmitting the held data to the information processing apparatus when an obtaining request requesting to obtain the held data is received, the one or more dynamic destination servers each include a processor to execute one or more programs of executable instructions embodied in a non-transitory computer readable medium, to configure the dynamic destination server to perform a method comprising:

communicating with the information processing apparatus;

obtaining the data being held by the static destination server;

temporarily holding the obtained data; and transmitting the obtained, temporarily held data to the information processing apparatus when an obtaining request requesting to obtain the obtained, temporarily held data is received, and the device includes a processor to execute one or more programs of executable instructions embodied in a non-transitory computer readable medium, to configure the device to perform a method comprising:
receiving the obtained, temporarily held data transmitted to the information processing apparatus for performing the device management processing; and
performing data processing using the received data.

11. An information processing apparatus including a processor to execute one or more programs of executable instructions embodied in a non-transitory computer readable medium, to configure the information processing apparatus to communicate with a device management apparatus through a first communication network, the information processing apparatus performing a method comprising:
(a) receiving, from the device management apparatus, a first performance request for performing a firmware update on one or more devices managed by the information processing apparatus, the first performance request including identification information identifying a dynamic destination server with a dynamically changing destination;
(b) transmitting to the dynamic destination server, using the identification information of the dynamic destination server included in the first performance request received in (a), an obtaining request requesting to obtain data being temporarily held by the dynamic destination server for performing device management processing;
(c) determining, when there is no response from the dynamic destination server to the obtaining request transmitted in (b), that the data being temporarily held by the dynamic destination server cannot be obtained;
(d) receiving, from the device management apparatus, after the information processing apparatus determines in (c) that the data being temporarily held by the dynamic destination server cannot be obtained, when there is no response to the obtaining request from the dynamic destination server, a second performance request including identification information identifying a static destination server with a fixed destination, the static destination server holding data for performing various types of device management processing, the data temporarily held by the dynamic destination server being the same as the data held by the static destination server;
(e) transmitting an obtaining request to the static destination server using the identification information of the static destination server included in the second performance request received in (d), to obtain the data being held by the static destination server; and
(f) performing device management processing, using, when the data being temporarily held by the dynamic destination server cannot be obtained, the data obtained in (e) from the static destination server.

12. The information processing apparatus according to claim 11, wherein the method performed by the information processing apparatus further comprises:
transmitting a notification to the device management apparatus indicating that the data being temporarily held by the dynamic destination server cannot be obtained from the dynamic destination server, when it is determined in (c) that the data being temporarily held by the dynamic destination server cannot be obtained from the dynamic destination server, the notification to the device management apparatus indicating that the data being temporarily held by the dynamic destination server cannot be obtained from the dynamic destination server being transmitted after the first performance request is first received, the first performance request including the identification information identifying the dynamic destination server, and next receiving the second performance request in (e) to perform the firmware update, the second performance request including the identification information identifying the static destination server,
when it is determined that the data being temporarily held by the dynamic destination server cannot be obtained, after the obtaining request requesting to obtain the data being temporarily held by the dynamic destination server for performing the firmware update is transmitted in (b), to the dynamic destination server using the identification information of the dynamic destination server included in the first performance request, the notification is transmitted to the device management apparatus indicating that the data being temporarily held by the dynamic destination server cannot be obtained, and
next transmitting the obtaining request requesting to obtain the data being held by the static destination server, to the static destination server using the identification information of the static destination server included in the second performance request received in (e), to obtain the data being held by the static destination server.

13. The information processing apparatus according to claim 11, wherein
the identification information identifying the dynamic destination server indicates one of a domain name and a host name, and
the method performed by the information processing apparatus further comprises identifying a destination address for connecting to the dynamic destination server from a Domain Name System (DNS) server, using said one of the domain name and the host name and upon connecting to the dynamic destination server, transmitting in (b) the obtaining request requesting to obtain data for performing the firmware update to the dynamic destination server, to obtain the data.

* * * * *